(12) United States Patent
Akagi et al.

(10) Patent No.: US 12,023,813 B2
(45) Date of Patent: Jul. 2, 2024

(54) CONTROL SYSTEM, CONTROL METHOD, AND CONTROL UNIT

(71) Applicant: OMRON Corporation, Kyoto (JP)

(72) Inventors: Tetsuya Akagi, Kyoto (JP); Takeshi Shoji, Ritto (JP); Kazunori Osako, Otsu (JP); Xiaoguang Ning, Otsu (JP); Kazuma Mishima, Kyoto (JP)

(73) Assignee: OMRON Corporation, Kyoto (JP)

( * ) Notice: Subject to any disclaimer, the term of this patent is extended or adjusted under 35 U.S.C. 154(b) by 393 days.

(21) Appl. No.: 17/439,819

(22) PCT Filed: Feb. 12, 2020

(86) PCT No.: PCT/JP2020/005277
§ 371 (c)(1),
(2) Date: Sep. 16, 2021

(87) PCT Pub. No.: WO2020/195267
PCT Pub. Date: Oct. 1, 2020

(65) Prior Publication Data
US 2022/0176560 A1 Jun. 9, 2022

(30) Foreign Application Priority Data

Mar. 28, 2019 (JP) ................. 2019-062711

(51) Int. Cl.
*B25J 9/00* (2006.01)
*B25J 9/16* (2006.01)
*B25J 13/08* (2006.01)

(52) U.S. Cl.
CPC ........... *B25J 9/1666* (2013.01); *B25J 9/1651* (2013.01); *B25J 9/1669* (2013.01); *B25J 9/1676* (2013.01); *B25J 9/1697* (2013.01); *B25J 13/089* (2013.01)

(58) Field of Classification Search
CPC ...... B25J 9/1666; B25J 9/1651; B25J 9/1669; B25J 9/1676; B25J 9/1697; B25J 13/089; B25J 19/06; G05B 2219/40202
See application file for complete search history.

(56) References Cited

U.S. PATENT DOCUMENTS

2003/0076224 A1* 4/2003 Braune ................. F16P 3/144
340/500
2010/0191372 A1* 7/2010 Nihei ....................... F16P 1/00
700/245

(Continued)

FOREIGN PATENT DOCUMENTS

CN 1461693 12/2003
CN 101142063 3/2008

(Continued)

OTHER PUBLICATIONS

S. Robla-Gomez et al, Working Together: A Review on Safe Human-Robot Collaboration in Industrial Environments, IEEE Access, vol. 5, Dec. 2017, pp. 26754-26773 [online], [retrieved on Dec. 14, 2023]. Retrieved from the Internet <URL: https://ieeexplore.ieee.org/document/8107677> (Year: 2017).*

(Continued)

*Primary Examiner* — Peter D Nolan
*Assistant Examiner* — Peter Y Ning
(74) *Attorney, Agent, or Firm* — JCIPRNET

(57) ABSTRACT

A control system (1) includes: a control device (100) that controls a robot (200); a three-dimensional sensor (300) that acquires positional information of a worker and the robot (200), which are included in a viewing-field area in a three-dimensional space; and a support device (400) that provides a user interface (411) for virtually setting a cooperation region in which the worker and the robot (200) are allowed to work. The control device (100) controls stopping or the speed of the robot (200) on the basis of whether or not (Continued)

the position of the worker or the robot (200) calculated on the basis of the positional information is included in the cooperation region, which is set by using the user interface (411), as well as the relative positional relationship between the worker and the robot (200) calculated on the basis of the positional information.

11 Claims, 16 Drawing Sheets

(56) References Cited

U.S. PATENT DOCUMENTS

| | | | | |
|---|---|---|---|---|
| 2012/0327190 | A1 | 12/2012 | Massanell et al. | |
| 2014/0288706 | A1* | 9/2014 | Asahi | B25J 9/1656 |
| | | | | 901/14 |
| 2017/0210017 | A1* | 7/2017 | Yamamoto | B25J 9/1674 |
| 2017/0355079 | A1* | 12/2017 | Takahashi | B25J 9/1676 |
| 2018/0236665 | A1* | 8/2018 | Takahashi | B25J 9/1697 |
| 2019/0061155 | A1* | 2/2019 | Hashimoto | B25J 9/1697 |
| 2020/0070340 | A1* | 3/2020 | Kurtz | B25J 9/163 |
| 2020/0198148 | A1* | 6/2020 | Ueno | B25J 9/1697 |
| 2023/0211496 | A1* | 7/2023 | Naitou | B25J 9/1676 |
| | | | | 700/253 |

FOREIGN PATENT DOCUMENTS

| | | | | |
|---|---|---|---|---|
| CN | 103249530 | | 8/2013 | |
| CN | 104626208 | | 5/2015 | |
| CN | 108008663 | | 5/2018 | |
| CN | 108568815 | | 9/2018 | |
| CN | 109153134 | | 1/2019 | |
| CN | 109421046 | | 3/2019 | |
| EP | 3473387 | A1 * | 4/2019 | |
| JP | H05305595 | | 11/1993 | |
| JP | 2003222295 | | 8/2003 | |
| JP | 2008191823 | | 8/2008 | |
| JP | 2010033738 | A * | 2/2010 | |
| JP | 2010082799 | | 4/2010 | |
| JP | 2010188515 | | 9/2010 | |
| JP | 2014180723 | | 9/2014 | |
| JP | 2016209953 | | 12/2016 | |
| JP | 2016209953 | A * | 12/2016 | |
| JP | 2017221985 | | 12/2017 | |
| JP | 2018130814 | | 8/2018 | |
| JP | 2018187746 | A * | 11/2018 | B25J 19/00 |
| JP | 2019010704 | | 1/2019 | |
| JP | 2019010704 | A * | 1/2019 | |
| JP | 2020028957 | A * | 2/2020 | B25J 13/08 |
| JP | 2020066080 | A * | 4/2020 | B25J 13/08 |
| WO | WO-2022229785 | A1 * | 11/2022 | |

OTHER PUBLICATIONS

"International Search Report (Form PCT/ISA/210) of PCT/JP2020/005277", mailed on Mar. 17, 2020, with English translation thereof, pp. 1-5.

"Written Opinion of the International Searching Authourity (Form/ISA/237) of PCT/JP2020/005277", mailed on Mar. 17, 2020, with English translation thereof, pp. 1-11.

"Office Action of Japan Counterpart Application" with English translation thereof, issued on Jun. 29, 2021, p. 1-p. 12.

S. Robla-Gómez et al., "Working Together: A Review on Safe Human-Robot Collaboration in Industrial Environments," IEEE Access, vol. 5, Dec. 2017, pp. 26754-26773.

"Search Report of Europe Counterpart Application", issued on Nov. 29, 2022, p. 1-p. 11.

Office Action of China Counterpart Application, with English translation thereof, issued on Dec. 7, 2023, pp. 1-18.

\* cited by examiner

Example of robot control table

| Worker \ Robot | Working region | Collaborative work region (Entry only at the time of carrying a workpiece) | Region on the worker side crossing the virtual boundary |
|---|---|---|---|
| Region on the robot side crossing the virtual boundary | Stop (Virtual boundary A) | Stop (Virtual boundary B) | Stop (Virtual boundary B) |
| Collaborative work region | Low speed | Stop | Stop (Virtual boundary B) |
| Region A | Low speed | Stop | Stop (Virtual boundary B) |
| Region B | Medium speed | Low speed | Stop (Virtual boundary B) |
| Other region | High speed | Medium speed | Stop (Virtual boundary B) |

FIG. 8

Example of stopping/speed setting in the support device
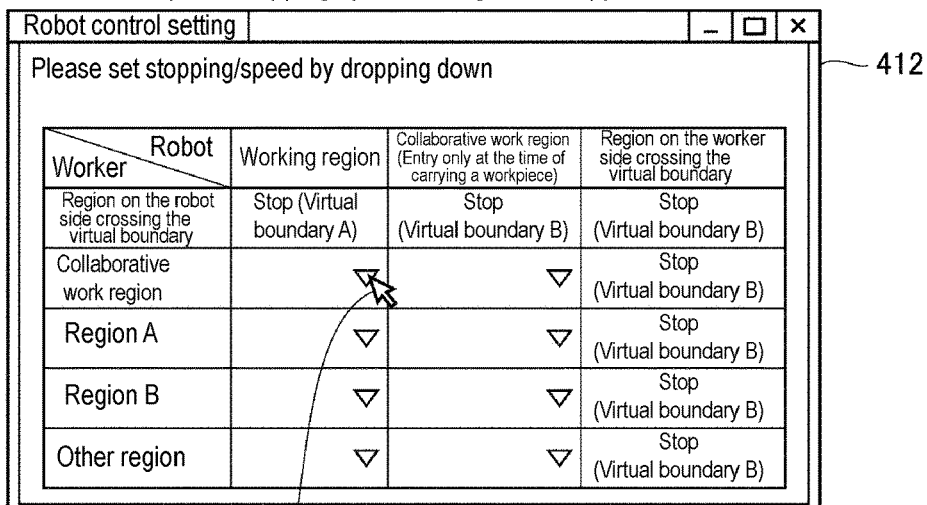
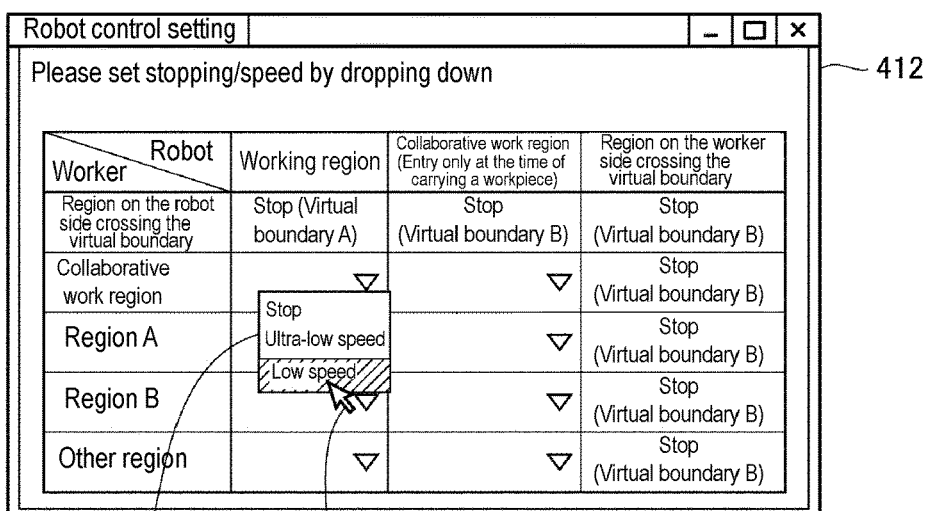
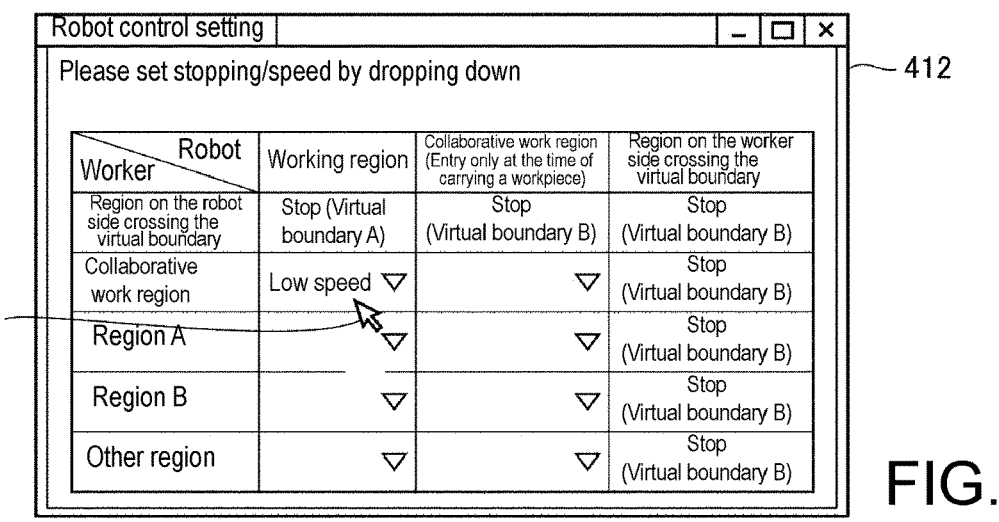
FIG. 10

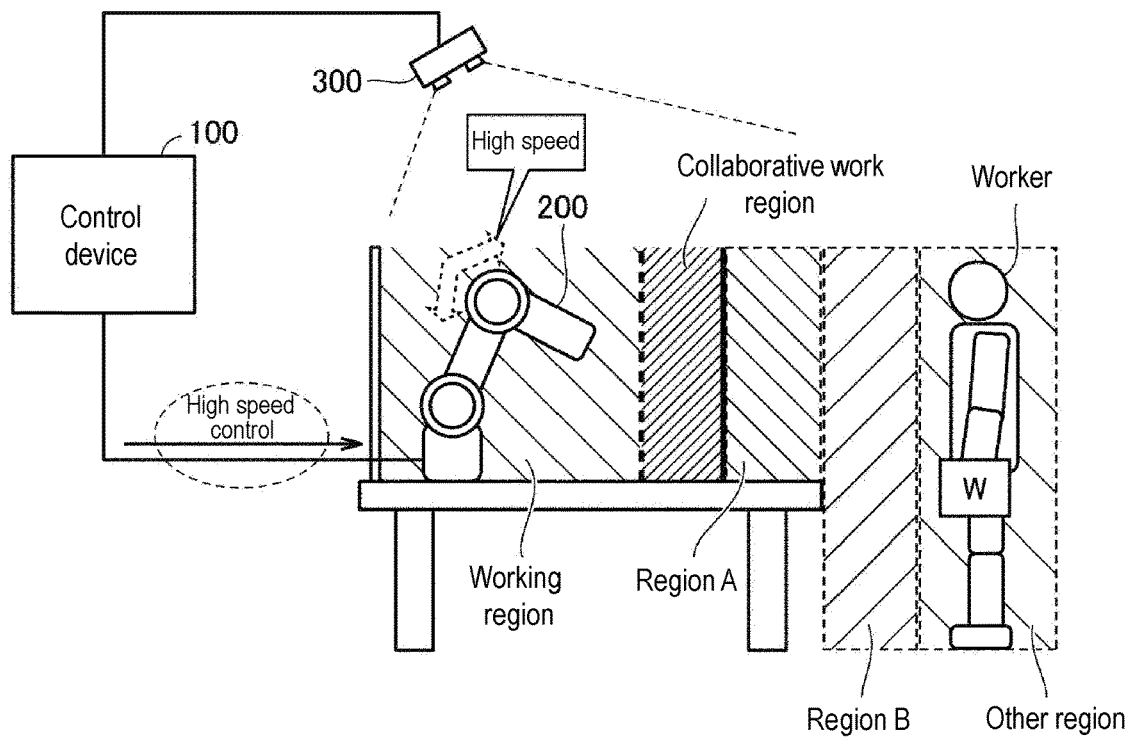
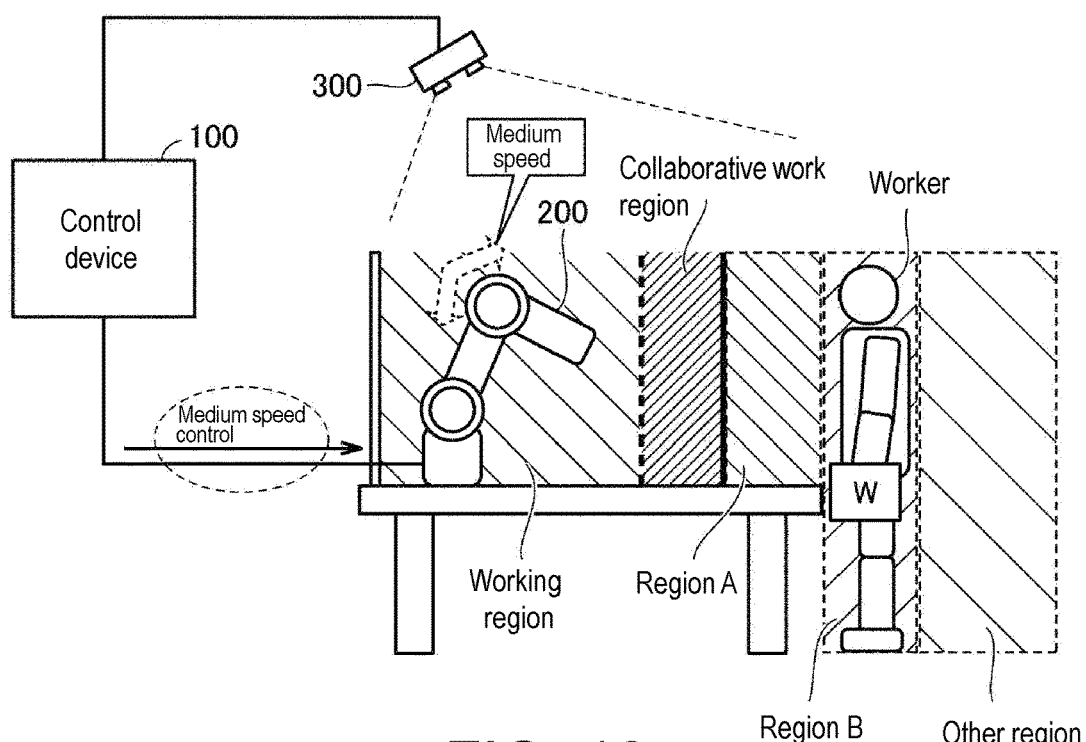
FIG. 12

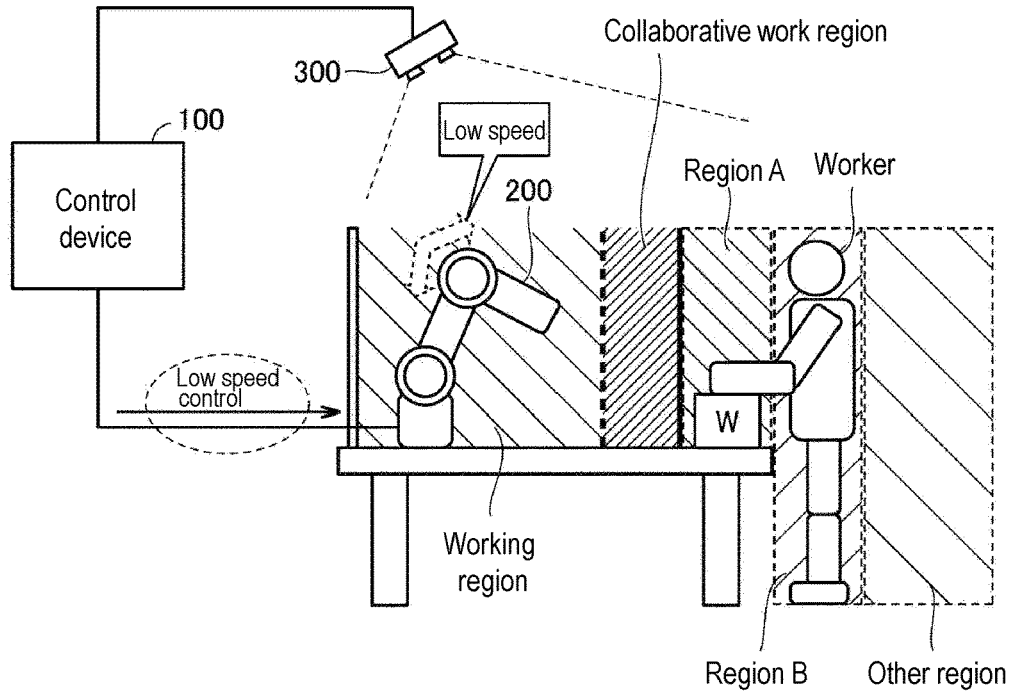
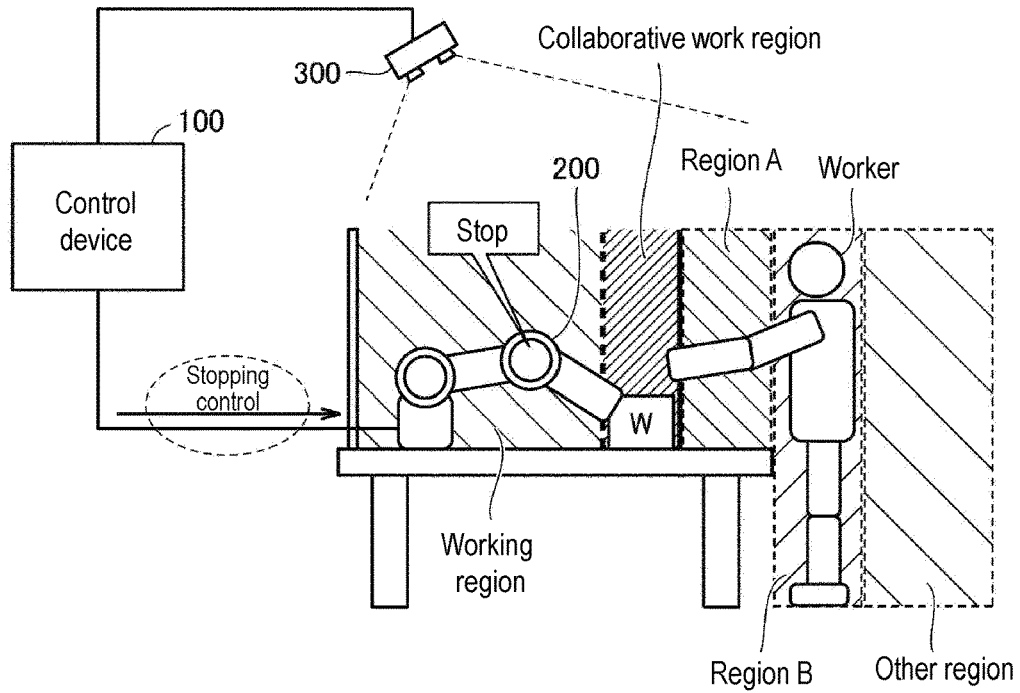
FIG. 13

CONTROL SYSTEM, CONTROL METHOD, AND CONTROL UNIT

CROSS-REFERENCE TO RELATED APPLICATION

This application is a 371 application of the International PCT application serial no. PCT/JP2020/005277, filed on Feb. 12, 2020, which claims the priority benefits of Japan Patent Application No. 2019-062711, filed on Mar. 28, 2019. The entirety of each of the above-mentioned patent applications is hereby incorporated by reference herein and made a part of this specification.

BACKGROUND OF THE INVENTION

Field of the Invention

The invention relates to a control system, a control method, and a control unit, and particularly relates to a control system, a control method and a control unit for controlling a robot.

Description of Related Art

In most production sites, works in which workers collaborate with robots are carried out frequently. In such production sites, various efforts have been made to ensure the safety of the workers. For example, Japanese Laid-open No. 2003-222295 (Patent Document 1) discloses a device which separates a dangerous region in which machines work and a non-dangerous region in which workers work by a security boundary, and controls an emergency stopping function in the case where the worker crosses the security boundary.

PRIOR ART DOCUMENT

Patent Document

[Patent Document 1] Japanese Laid-open No. 2003-222295

SUMMARY OF THE INVENTION

Problems to be Solved by the Invention

Meanwhile, in recent years, in production sites using robots as described above, safety standards have been established to build a system where workers and robots share a work region without being separated by safety measures, etc. For example, ISO 10218-1, ISO10218-2, and ISO/TS 15066 stipulate the safety requirements regarding collaborative robots capable of working in collaboration with workers or robot systems using collaborative robots.

The establishment of production sites using collaborative robots is still in progress, specifically, a technology enhancing safety as well as productivity is still desired. However, in the system disclosed in Patent Document 1, the region in which the machine works and the region in which the worker works are completely separated, and no consideration is given to a system following the above safety standards.

An objective of the invention is to solve the above issue, and the invention aims at providing a technology increasing safety as well as productivity in a production site in which a robot and a worker collaborate with each other.

Means for Solving Problems

According to an example of the disclosure, a control system controlling a robot is provided. The control system includes: a control means, controlling the robot; a three-dimensional sensor means, acquiring position information of a worker and the robot included in a viewing-field area in a three-dimensional space; and a setting support means, providing a user interface for virtually setting a collaborative work region in which the worker and the robot are allowed to work. The control means controls stopping or a speed of the robot based on whether a position of the worker or the robot calculated based on the position information is included in the collaborative work region set by using the user interface and a relative position relationship between the worker and the robot calculated based on the position information.

According to the disclosure, the user can virtually set the collaborative work region where the worker and the robot are allowed to work, and the stopping or the velocity of the robot can be controlled based on whether the positions of the worker and the robot in the three-dimensional space are included in the virtually set collaborative work region and the relative position relationship between the worker and the robot in the three-dimensional space. Accordingly, the user can increase the safety as well as the productivity in the production site where the robot collaborates with the worker.

In the above disclosure, the control means controls the stopping or the speed of the robot based on whether the worker or the robot crosses a virtual boundary virtually provided at an end of the collaborative work region.

According to the disclosure, since the user can properly control the stopping or the speed of the robot by using the virtual boundary virtually provided at the end of the collaborative work region, the safety as well as the productivity in the production site where the robot and the worker collaborate with each other can be increased.

In the above disclosure, the virtual boundary is switched in accordance with whether the position of the robot is included in the collaborative work region.

According to the disclosure, since the user can properly provide the virtual boundary in accordance with the position of the robot, the safety as well as the productivity can be increased.

In the above disclosure, the control system includes an embodying means for visually embodying the virtual boundary in a workspace.

According to the disclosure, since the user can perform a work while checking the virtual boundary visually embodied in the workspace, the safety as well as the productivity can be increased.

In the above disclosure, the control means controls the stopping or the speed of the robot based on whether an object including the worker or the robot enters the collaborative work region from a worker side or whether the object enters the collaborative work region from a robot side.

According to the disclosure, the user can properly control the stopping or the speed of the robot based on whether the object including the worker or the robot enters the collaborative work region and whether the object enters the collaborative work region from the direction of one of the worker side and the robot side. Therefore, the safety as well as the productivity can be increased without setting the virtual boundary.

In the above disclosure, the setting support means provides a user interface for setting a plurality of types of regions comprising the collaborative work region as regions where the worker and the robot respectively work.

According to the disclosure, since the user can set desired regions including the collaborative work region as the regions where the worker and the robot respectively work, the safety as well as the productivity can be increased.

In the disclosure, the control system includes a control content setting means providing a user interface for setting a control content of the robot in accordance with the relative position relationship between the worker and the robot.

According to the disclosure, since the user can freely set the control content of the robot in accordance with the relative position relationship between the worker and the robot, the safety as well as the productivity can be increased.

In the above disclosure, the setting support means provides a user interface for virtually setting the collaborative work region based on an image corresponding to the viewing-field area in the three-dimensional sensor means.

According to the disclosure, since the user can virtually set the collaborative work region based on the image corresponding to the viewing-field area in the three-dimensional sensor means, the safety as well as the productivity can be increased.

In the above disclosure, the control system includes a forbidding means forbidding control of the stopping or the speed of the robot by the control means based on a position of a workpiece related to a work.

According to the disclosure, since the stopping or the speed of the robot is not controlled due to detection of the position of the workpiece, the safety as well as the productivity can be increased.

According to another example of the disclosure, a control method controlling a robot is provided. A collaborative work region where a worker and the robot are allowed to work is virtually set by a user interface. The control method includes: a step of controlling the robot; and a step of acquiring position information of the worker and the robot included in a viewing-field area in a three-dimensional space. The step of controlling the robot includes a step of controlling stopping or a speed of the robot based on whether a position of the worker or the robot calculated based on the position information is included in the collaborative work region and a relative position relationship between the worker and the robot calculated based on the position information.

According to the disclosure, the user can virtually set the collaborative work region where the worker and the robot are allowed to work, and the stopping or the velocity of the robot can be controlled based on whether the positions of the worker and the robot in the three-dimensional space are included in the virtually set collaborative work region and the relative position relationship between the worker and the robot in the three-dimensional space. Accordingly, the user can increase the safety as well as the productivity in the production site where the robot collaborates with the worker.

According to another example of the disclosure, a control unit controlling a robot is provided. The control unit includes: a control part, controlling the robot; and a setting support tool, providing a user interface for virtually setting a collaborative work region in which a worker and the robot are allowed to work. The control part controls stopping or a speed of the robot based on whether a position of the worker or the robot calculated based on position information acquired by a three-dimensional sensor is included in the collaborative work region set by using the user interface and a relative position relationship between the worker and the robot.

According to the disclosure, the user can virtually set the collaborative work region where the worker and the robot are allowed to work, and the stopping or the velocity of the robot can be controlled based on whether the positions of the worker and the robot in the three-dimensional space are included in the virtually set collaborative work region and the relative position relationship between the worker and the robot in the three-dimensional space. Accordingly, the user can increase the safety as well as the productivity in the production site where the robot collaborates with the worker.

BRIEF DESCRIPTION OF THE DRAWINGS

FIG. 8 is a schematic diagram illustrating an example of a robot control table used in the control system according to the embodiment.

FIG. 10 is a schematic diagram illustrating a stopping/speed setting in the support device according to the embodiment.

FIG. 12 is a schematic diagram illustrating an example of a safety control process executed in the control system according to the embodiment.

FIG. 13 is a schematic diagram illustrating an example of a safety control process executed in the control system according to the embodiment.

DESCRIPTION OF THE EMBODIMENTS

Figure 1:
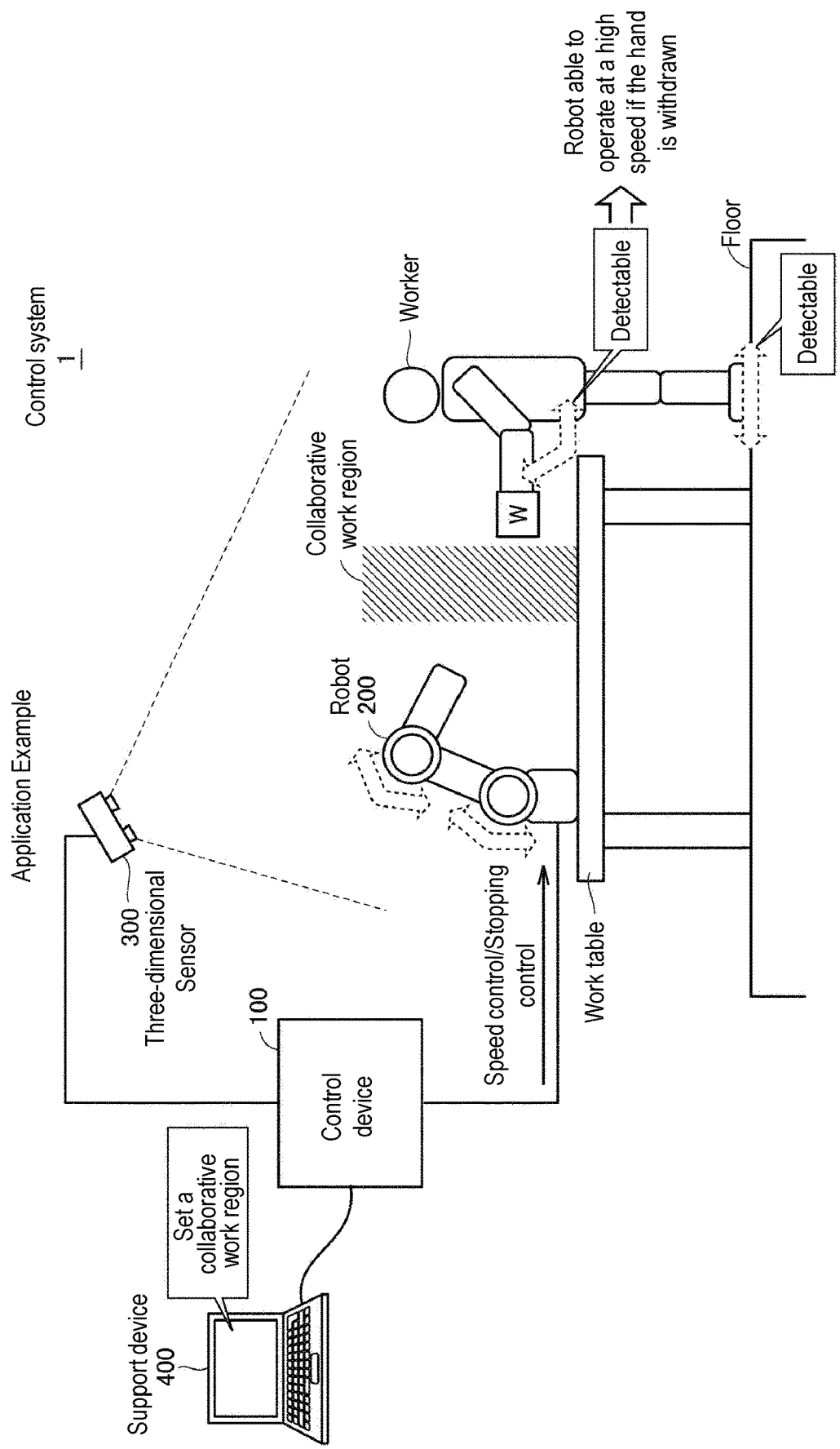
FIG. 1 is a schematic diagram illustrating an application example of a control system according to an embodiment.

Embodiments of the invention will be described in detail with reference to the drawings. The same or corresponding parts in the drawings are designated by the same reference numerals and the description thereof will not be repeated.

A. APPLICATION EXAMPLE

An example of a case to which the invention is applied is described.

FIG. 1 is a schematic diagram illustrating an application example of a control system according to the embodiment. As shown in FIG. 1, a control system 1 according to the embodiment is a system where a worker and a robot 200 share a work region without being separated by a safety measure, etc., in a production site.

For example, in the example shown in FIG. 1, the robot 200 is provided on a work table installed to a floor, and the worker holds a workpiece (shown as "W") to be opposite to the robot 200. A collaborative work region (also known as "collaborative workspace") is assigned, as a virtual region, between the worker and the robot 200. The collaborative work region may also be referred as a collaborative workspace.

The control system 1 according to the embodiment is established in accordance with a predetermined safety standard (ISO 10218-1, ISO10218-2, and ISO/TS 15066), and the collaborative work region is a region in which the worker and the robot are allowed to work. That is, the robot 200 according to the embodiment is a collaborative robot having taken into consideration the aspect of safety function so as to be able to directly interact with a human being (referred to as "worker" in the specification). In other words, the robot 200 according to the embodiment is designed to satisfy the safety requirements stipulated in the safety standard when working in collaboration with human beings.

The control system 1 includes a control device 100 controlling the robot 200, a three-dimensional sensor 300 acquiring position information of the worker and the robot 200, and a support device 400 supporting control of the robot 200 in the control device 100.

The control device 100 includes a "control means" according to the disclosure, and controls the robot 200 by outputting a control command designating the driving, stopping, and speed during operation of the robot 200 with respect to the robot 200. The robot 200 is driven, operates at the designated speed, and stops in accordance with needs based on the control command from the control device 100. In the embodiment, the control device 100 may be a programmable controller (PLC), which is a processing entity executing a control program (which may include sequence control and motion control), and may also be any device controlling the robot 200 and not limited to a PLC.

The three-dimensional sensor 300 includes a "three-dimensional sensor means" according to the disclosure, and obtains the position information of the worker and the robot 200 included in a viewing-field area in a three-dimensional space. The specific configuration of the three-dimensional sensor 300 will be described with reference to FIG. 5.

The support device 400 includes a "setting support means" according to the disclosure, and provides a user interface for virtually setting the collaborative work region in which the worker and the robot 200 are allowed to work.

In the control system 1 including the above configuration, firstly, the user (the worker, and the management personnel of the control system 1, etc.) virtually sets the size (e.g., an area) of the collaborative work region in a three-dimensional space in a workplace by using the user interface provided by the support device 400. The data for specifying the collaborative work region set by using the support device 400 is output to the control device 100. In addition, the data for specifying the collaborative work region set by using the support device 400 may be output via the control device 100 or directly output from the support device 400 to the three-dimensional sensor 300.

During the work, the three-dimensional sensor 300 acquires the position information for each of the worker and the robot 200 in the three-dimensional space. The position coordinates (e.g., X-coordinate, Y-coordinate, and Z-coordinate) in the three-dimensional space handled by the support device 400 and the position coordinates (X-coordinate, Y-coordinate, and Z-coordinate) in the three-dimensional space handled by the three-dimensional sensor 300 are calibrated in advance to match each other.

Based on the position information of each of the worker and the robot 200 acquired by the three-dimensional sensor 300, the current position of each of the worker and the robot 200 is calculated. Such process of calculating the current position of each of the worker and the robot 200 may be executed by the three-dimensional sensor 300 to output the result of the process to the control device 100, and may also be executed by the control device 100 based on the position information acquired by the three-dimensional sensor 300.

When the current position of each of the worker and the robot 200 is calculated, whether the position of the worker or the robot 200 is included in the collaborative work region set by the support device 400 at this time is determined, and the relative position relationship between the worker and the robot 200 is specified. Here, the "position" of the worker is assumed to be the position of each point of the worker detected in the three-dimensional space. For example, the "position" of the worker may include the position of the head, body, hands, or feet, etc., of the worker. In addition, the "position" of the robot 200 is assumed to be the position of each point of the robot 200 detected in the three-dimensional space. For example, the "position" of the robot 200 may include the position of the body part (body), the arm part (arm), the joint part, or the end effector, etc., of the robot 200.

In the control system 1, whether the position of the worker is included in the collaborative work region and whether the position of the robot 200 is included in the collaborative work region are determined, and the regions including the respective positions of the worker and the robot 200 among the various regions included in the three-dimensional space in the workplace are specified. It is noted that the process of determining whether the position of the worker or the robot 200 is included in the collaborative work region and the process of specifying the relative position relationship between the worker and the robot 200 may be executed by the three-dimensional sensor 300 to output the result of the process to the control device 100, and may also be executed by the control device 100 based on the position information acquired from the three-dimensional sensor 300.

The control device 100 controls the robot 200 by outputting a predetermined control command to the robot 200 based on whether the position of the worker or the robot 200 is included in the collaborative work region and the relative position relationship between the worker and the robot.

Details in this regard will be described with reference to FIGS. 12 and 13. However, for example, the more apart the worker is from the robot 200, the faster the robot 200 is controlled to operate, and the closer the worker is from the robot 200, the slower the robot 200 is controlled to operate, or even the robot 200 is controlled to stop. In addition, if the worker is located in the collaborative work region and the robot 200 leaves the collaborative work region, the robot 200 is controlled to operate. Alternatively, if the robot 200 is located in the collaborative work region and the worker leaves the collaborative work region, the robot 200 is controlled to operate in the collaborative work region. Moreover, in the case where the worker and the robot 200 are located in the collaborative work region at the same time, the robot 200 is controlled to stop.

Figure 2:
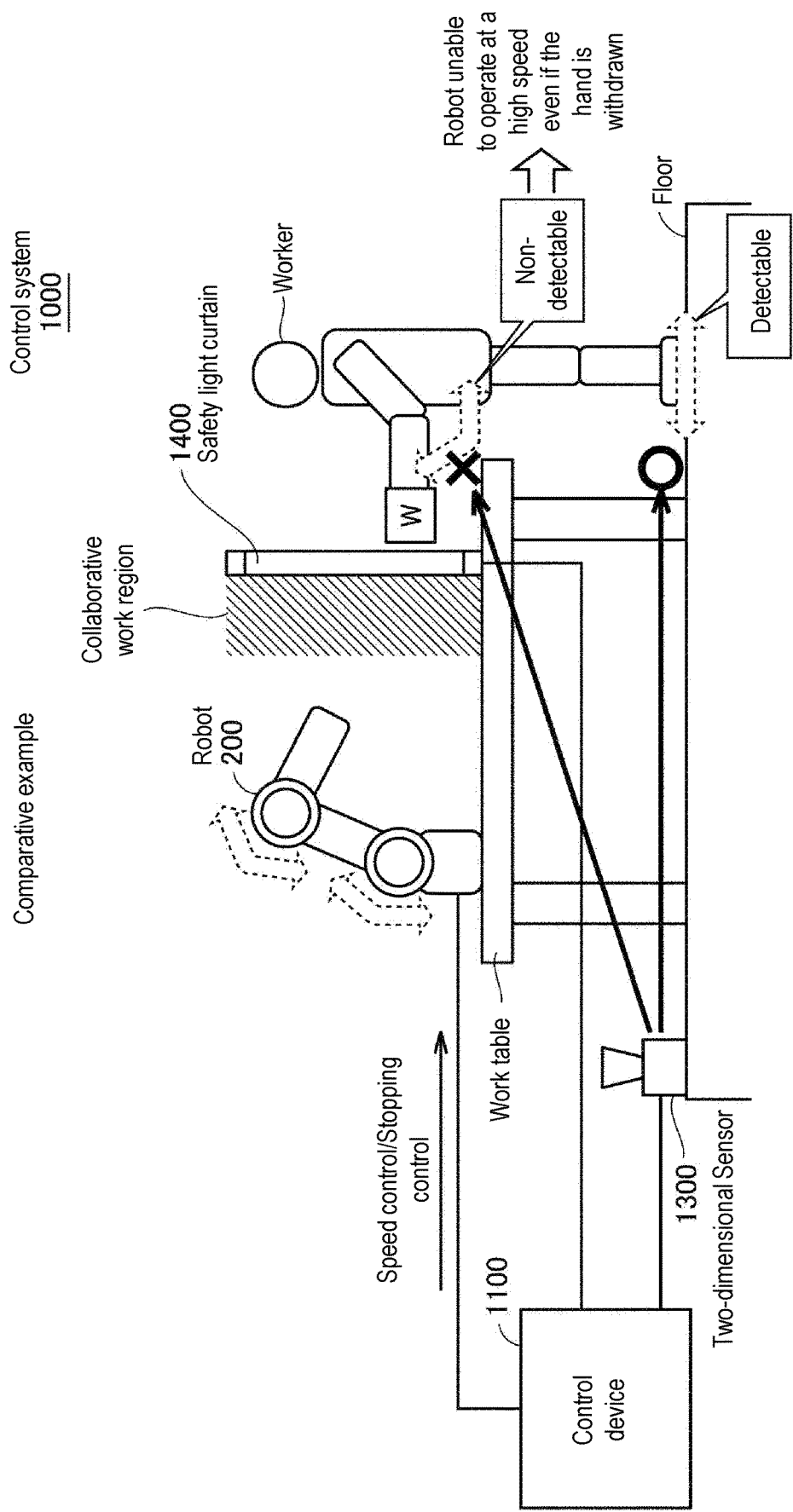
FIG. 2 is a schematic diagram illustrating a control system according to a comparative example.

Here, FIG. 2 is a schematic diagram illustrating a control system 1000 according to a comparative example. As shown in FIG. 2, in the control system 1000 according to the comparative example, a control device 1100 specifies the position of the worker based on the position information of the worker acquired by a two-dimensional sensor 1300. That is, the control system 1000 according to the comparative example does not detect the position of the worker and the robot 200 in the three-dimensional space like the control system 1 according to the embodiment, but detects the position of the worker in two dimensions (e.g., X-axis and Y-axis in a plane parallel to the floor).

In addition, the control system 1000 makes sure the safety of the worker by setting a safety light curtain 1400 between the robot 200 and the worker, and when the worker or the robot 200 crosses the light curtain 1400, the control device 1100 stops the robot 200. Accordingly, when the worker works in the collaborative work region, the robot 200 stops.

Since the control system 1000 so configured detects the position of the worker in two dimensions, for example, the current position of the worker can be specified by detecting the movement of the lower body, such as the worker's feet. However, since the control device 1000 cannot detect the movement of the upper body, such as the user's hands, arms, etc., by using the two-dimensional sensor 1300, if the robot 200 is to be operated at a high speed, the worker must retreat to a position sufficiently apart from the robot 200. That is, in the case where the robot 200 is controlled by detecting only the movement of the lower body of the worker, a sufficient margin must be considered with respect to the detected position of the worker which triggers the transition from a low-speed operation to a high-speed operation.

Comparatively, as shown in FIG. 1, the control device 100 according to the embodiment can also detect the movement of the upper body such as the worker's hands, arms, etc., by the three-dimensional sensor 300. Therefore, the control device 100 can determine that the distance between the worker and the robot 200 is sufficient even if the worker does not retreat but simply withdraws his/her hand, for example, and the robot 200 can be transitioned from a low-speed operation to a high-speed operation.

Accordingly, by recognizing the relative position relationship between the worker and the robot in the three-dimensional space based on the position information acquired by the three-dimensional sensor 300, safety can be ensured, and the distance to the robot 200 operating at a high speed which the worker can approach can be shortened as much as possible. In other words, a longer time in which the high-speed operation of the robot 200 is allowed can be ensured.

Moreover, according to the control system 1 according to the embodiment, the user can virtually set the collaborative work region where the worker and the robot 200 are allowed to work, and can control the stopping or the speed of the robot 200 based on whether the positions of the worker and the robot 200 in the three-dimensional space are included in the virtually set collaborative work region and the relative position relationship between the worker and the robot 200 in the three-dimensional space. That is, the user can set a desired region as the collaborative work region and, with the set collaborative work region serving as reference, control the stopping or the speed of the robot 200 based on the relative position relationship between the worker and the robot 200. Accordingly, the user can increase the safety as well as the productivity in the production site where the robot 200 collaborates with the worker.

B. HARDWARE CONFIGURATION OF RESPECTIVE DEVICES INCLUDED IN CONTROL SYSTEM 1

In the following, an example of the hardware configuration of each device included in the control system 1 is described.

(b1: Control Device 100)

Figure 3:
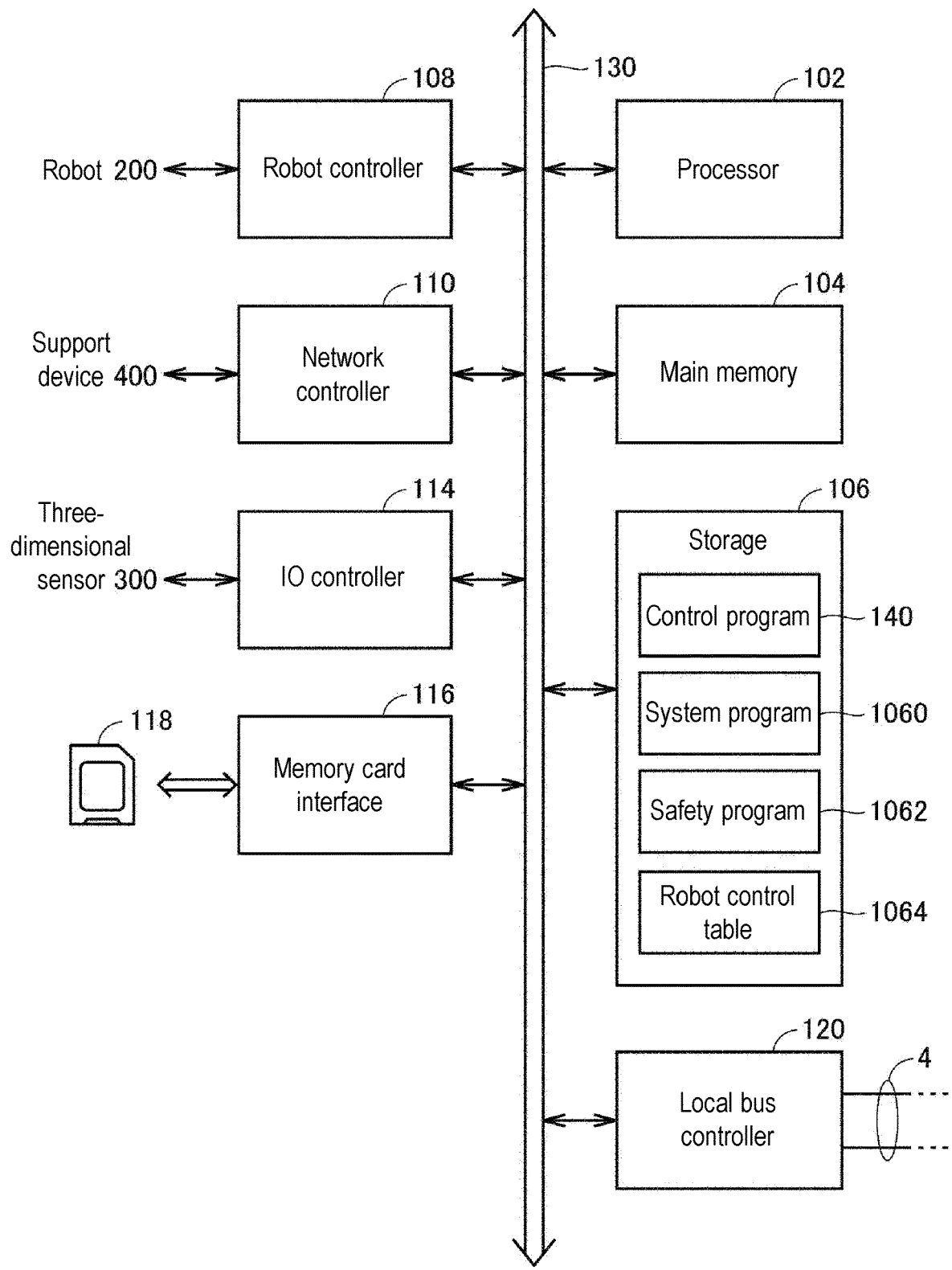
FIG. 3 is a schematic diagram illustrating a hardware configuration example of a control device according to the embodiment.

FIG. 3 is a schematic diagram illustrating a hardware configuration example of the control device 100 according to the embodiment. Although the description is omitted, the control device 100 according to the embodiment is functionally secured. As shown in FIG. 3, the control device 100 includes a processor 102, a main memory 104, a storage 106, a local bus controller 120, a robot controller 108, a network controller 110, an IO controller 114, and a memory card interface 116. These components are connected via a processor bus 130.

The processor 102 is mainly an arithmetic part executing a control arithmetic operation, such as being configured by a central processing unit (CPU), a graphics processing unit (GPU), etc. Specifically, the processor 102 reads a program (as an example, a control program 140, a system program 1060, and a safety program 150) stored in the storage 106, expands the program in the main memory 104, and executes the program, thereby realizing predetermined control in accordance with a control target (e.g., the robot 200).

While a configuration example in which necessary functions as the control device 100 are provided through the processor 102 executing a predetermined program is shown in the example of FIG. 3, some or all of the provided functions may also be implemented by using a dedicated hardware circuit (e.g., an ASIC, an FPGA, etc.).

The main memory 104, for example, is configured by a non-volatile storage device, such as a dynamic random access memory (DRAM), a static random access memory (SRAM).

The storage 106 is configured by a non-volatile storage device, such as a solid state drive (SSD), a hard disk drive (HDD), etc. In addition to the system program 1060 for realizing basic functions, the storage 106 stores the control program 140 created in accordance with the control target such as the machines or equipment including the robot 200, a safety program 1062 executed for ensuring the safety of the worker in the collaborative operation between the worker and the robot 200, and a robot control table 1064 taken as reference when the safety program 1062 is executed.

The robot control table 1064, for example, stores the command information for controlling the stopping or the speed of the robot 200 in accordance with whether the position of the worker or the robot 200 is included in the collaborative work region and the relative position relationship between the worker and the robot 200. Details of the robot control table 1064 will be described with reference to FIG. 8.

By executing the control program 140, the processor 102 controls the main routine of production with respect to the control target such as the machines or equipment including the robot 200. In addition, by executing the control program 140 in parallel with the safety program 1062, the processor executes the safety control process which controls the stopping or the speed of the robot 200 based on the position information of the worker and the robot 200 acquired by the three-dimensional sensor 300. More specifically, by executing the safety control process, the processor 102 specifies the region in which the worker or the robot 200 is located based on the position of the worker or the robot 200 specified by the three-dimensional sensor 300 and the respective regions determined in advance, such as the collaborative work region, and controls the stopping or the speed of the robot 200 based the result of specification. Details of the specific flow of the safety control process will be described with reference to FIG. 14.

The local bus controller 120 exchanges data with any unit connected to the control device 100 via a local bus.

The robot controller 108 exchanges data with the robot 200 via a predetermined network. Specifically, in the embodiment, the control device 100 outputs the control command for designating the driving, stopping, and the speed during operation of the robot 200 via the robot controller 108 to the robot 200.

The network controller 110 exchanges data with the support device 400 via a network. Specifically, in the embodiment, the control device 100 acquires data for specifying the collaborative work region set by the user from the support device 400 via the network controller 110. In addition, the control device 100 acquires data for specifying the control content of the robot 200 set by the user from the support device 400 via the network controller 110. The data for specifying the control content of the robot 200, which is acquired via the network controller 110, is included in the robot control table 1064 and stored in the storage 106.

The IO controller 114 exchanges data with the three-dimensional sensor 300 via a predetermined network. Specifically, in the embodiment, the control device 100 acquires the position information of the worker and the robot 200 via the IO controller 114, and acquires the result of determination on the region in which the worker or the robot 200 is located based on the position information. It is noted that, in the case where the control device 100 is a PLC, in order to simplify the amount of information in the PLC as much as possible, the determination on the region in which the worker or the robot 200 is located may also be handled by the three-dimensional sensor 300, and the control device 100 may just acquire the result of determination from the three-dimensional sensor 300.

The memory card interface 116 receives a memory card 118 as an example of a removable recording medium. The memory card interface 116 can write data to the memory card 118 and read various data (logs, trace data, etc.) from the memory card 118.

(b2: Support Device 400)

Figure 4:
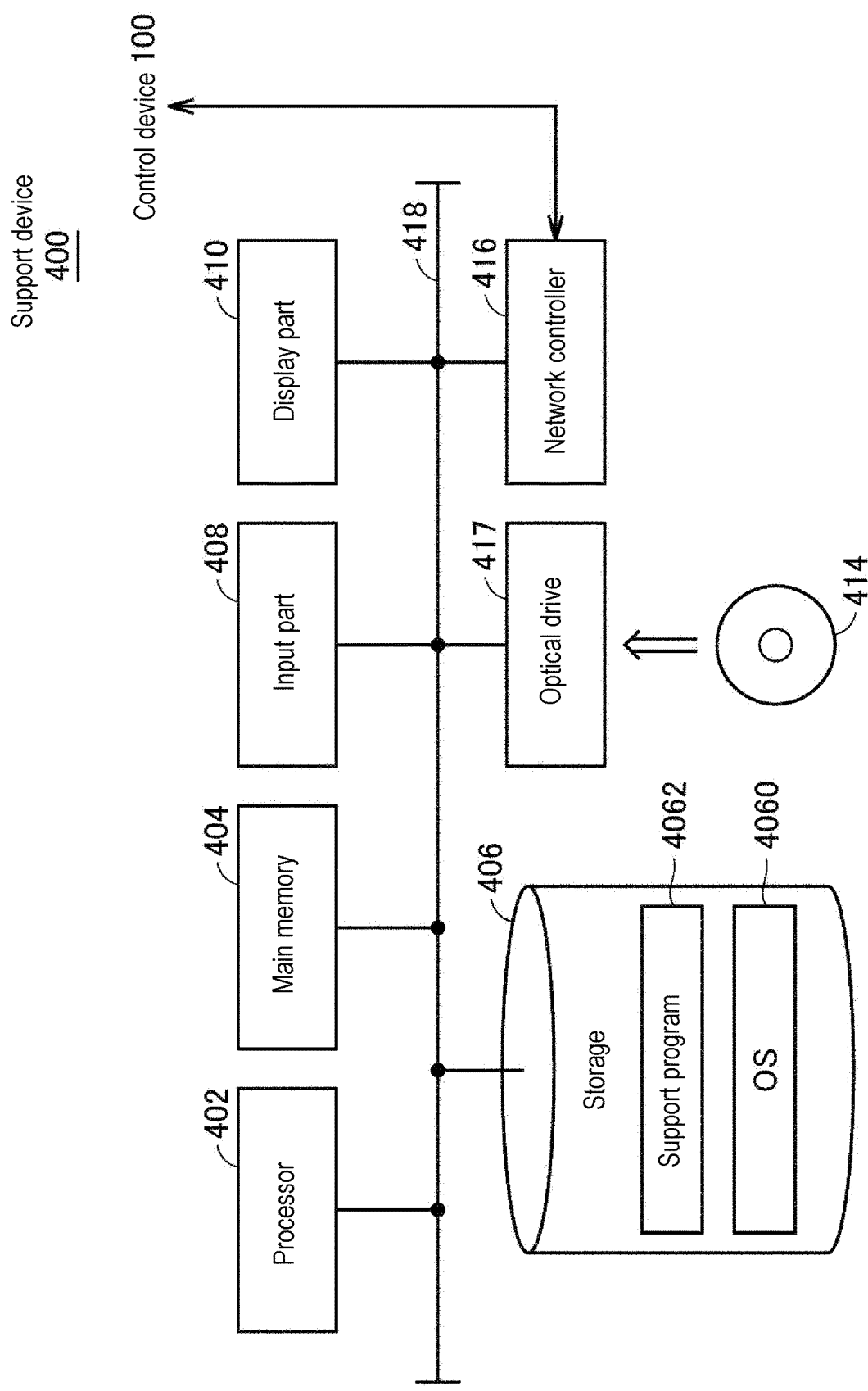
FIG. 4 is a schematic diagram illustrating a hardware configuration example of a support device according to the embodiment.

FIG. 4 is a schematic diagram illustrating a hardware configuration example of the support device 400 according to the embodiment. As an example, the support device 400 is realized by executing a program by a computer following a general-purpose architecture.

As shown in FIG. 4, the support device 400 includes a processor 302, a main memory 404, a storage 406, an input part 408, a display part 410, an optical drive 417, and a network controller 416. These components are connected to be communicable with each other via a processor bus 418.

The processor 402 is configured by a CPU or a GPU, reads a program (as an example, an OS 4060 and a support program 4062) stored in the storage 406, expands the program in the main memory 404, and executes the program, thereby realizing various processes.

While a configuration example in which necessary functions as the support device 400 are provided through the processor 402 executing a predetermined program is shown in the example of FIG. 4, some or all of the provided functions may also be implemented by using a dedicated hardware circuit (e.g., an ASIC, an FPGA, etc.).

The main memory 404, for example, is configured by a non-volatile storage device, such as a DRAM, an SRAM.

The storage 406 is configured by a non-volatile storage device, such as an HDD or an SSD. In addition to the OS 4060 for realizing basic functions, the storage 406 stores the support program 4062 for providing functions as the support device 400. The support program 4062 includes commands supporting the control of the robot 200 in the control device 100.

The processor 402 provides a user interface for virtually setting the collaborative work region in which the worker and the robot 200 are allowed to work by executing the support program 4062. Details of the user interface for setting the collaborative work region provided by the support device 400 will be described with reference to FIG. 9. The data for specifying the collaborative work region set by the support device 400 is transmitted to the control device 100 via the network controller 416.

In addition, by executing the support program 4062, the processor 402 provides a user interface for setting the control content of the robot 200 in accordance with the relative position relationship between the worker and the robot 200. Details of the user interface for setting the control content of the robot 200 will be described with reference to FIG. 10. The data for specifying the control content of the robot 200 set by the support device 400 is transmitted to the control device 100 via the network controller 416.

The input part 408 is configured by a keyboard, a mouse, etc., and receives a user operation. The display part 410 is configured by a display, various indicators, a printer, etc., and outputs the processing result from the processor 402.

The network controller 416 exchanges data with an arbitrary external device such as the control device 100 via a network.

The optical drive 417 receives a recording medium (e.g., an optical recording medium like a digital versatile disc (DVD)) 414 non-transiently storing a computer-readable program. The program stored in the recording medium 414 is installed to the storage 406, etc.

The support program 4062, etc., executed by the support device 400 may be installed via the recording medium 414 which is computer-readable, and may also be downloaded from a server device in a network to be installed. In addition, the functions provided by the support device 400 according to the embodiment may also be realized in the form using some of the modules provided by the OS 4060.

(b3: Three-Dimensional Sensor 300)

Figure 5:
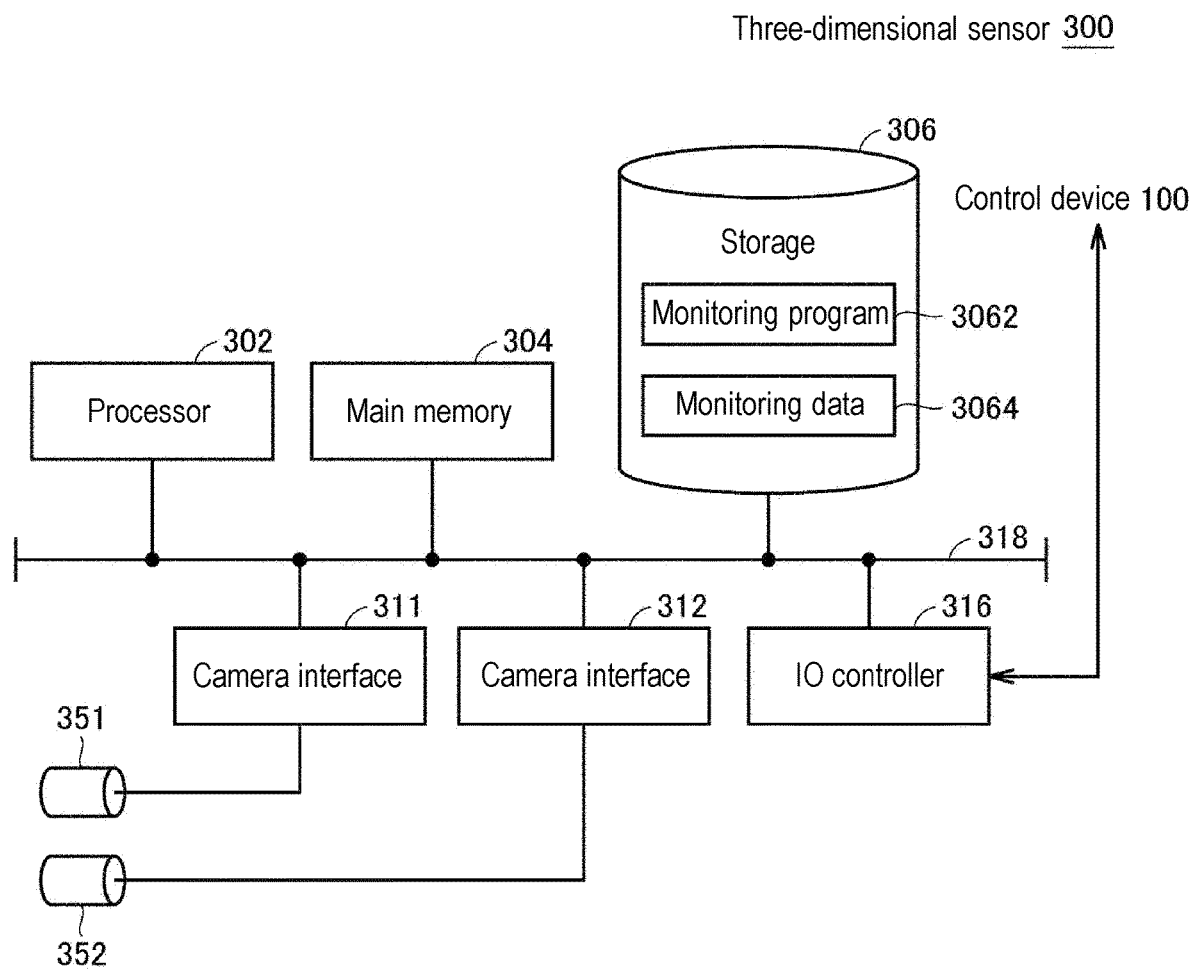
FIG. 5 is a schematic diagram illustrating a hardware configuration example of a three-dimensional sensor according to the embodiment.

FIG. 5 is a schematic diagram illustrating a hardware configuration example of the three-dimensional sensor 300 according to the embodiment. Although the description is omitted, the three-dimensional sensor 300 according to the embodiment, like the control device 100, is functionally secured. The three-dimensional sensor 300 according to the embodiment is a so-called passive stereo camera, and is configured to acquire the position information of an object included in the viewing-field areas of the cameras in the three-dimensional space by capturing images of the same space by multiple cameras (e.g., two cameras) from respectively different positions.

As shown in FIG. 5, the three-dimensional sensor 300 includes a processor 302, a main memory 304, a storage 306, a camera interface 311, a camera interface 312, a camera 351, a camera 352, and an IO controller 316. These components are connected to be communicable with each other via a processor bus 318.

The processor 302 is configured by a CPU or a GPU, reads a program (as an example, a monitoring program 3062) stored in the storage 306, expands the program in the main memory 304, and executes the program, thereby realizing various processes.

While a configuration example in which necessary functions as the three-dimensional sensor 300 are provided by the processor 302 executing a predetermined program is shown in the example of FIG. 5, some or all of the provided functions may also be implemented by using a dedicated hardware circuit (e.g., an ASIC, an FPGA, etc.).

The main memory 304, for example, is configured by a non-volatile storage device, such as a DRAM, an SRAM.

The storage 306 is configured by a non-volatile storage device, such as an HDD or an SSD. The storage 306 stores the monitoring program 3062 for monitoring the worker and the robot 200, and monitoring data 3064 taken as reference during execution of the monitoring program 3062.

The camera interface 311 exchanges data between the processor 302 and the camera 351. The camera interface 312 exchanges data between the processor 302 and the camera 352.

The IO controller 316 exchanges data with the control device 100 via a predetermined network. Specifically, in the embodiment, the three-dimensional sensor 300 transmits the position information of the worker and the robot 200 or the result of determination on the region in which the worker or the robot 200 is located based on the position information to the control device 100 via the IO controller 316.

The three-dimensional sensor 300 including such configuration acquires the images of the object included in the viewing-field areas by the respective cameras 351 and 352. The camera 351 and the camera 352 are provided to capture the images of the object from viewpoints different from each other, and the distances to the respective points of the object are calculated based on the respectively captured images from the different viewpoints. Accordingly, the position information (X-coordinate, Y-coordinate, Z-coordinate) of the respective points of the object (the worker, the robot 200, the workpiece, etc.) included in the viewing-field areas in the three-dimensional space is acquired.

The three-dimensional sensor 300 according to the embodiment specifies the position of each point of the worker, the robot 200, or the workpiece based on the position information acquired through the images captured by the cameras 351 and 352. For example, in the three-dimensional sensor 300, as an initial setting, the position information of each point in the three-dimensional space with only background is set in a state in which the worker, the robot 200, and the workpiece are not present. The position information with only background is included in the monitoring data 3064 stored in the storage 306. When acquiring the position information of the worker, the robot 200, or the workpiece at the time of working, the processor 302 calculates the difference between the acquired position information and the position information with only background that is prepared in advance, and specifies the position of each point of the worker, the robot 200, or the workpiece based on the result of calculation. The result of specification is transmitted to the control device 100.

It is noted that the three-dimensional sensor 300 is not limited to specifying the position of each point of the worker, the robot 200, or the workpiece by using the difference with the position information with the background only, and other means may also be used. For example, in the three-dimensional sensor 300, the monitoring data 3064 may include a feature value regarding each object, such as the worker, the robot 200, and the workpiece, etc., and the processor 302 may extract the feature value of the object based on the position information acquired by the images captured by the cameras 351 and 352, compare the extracted feature value of the object with the feature value of the object included in the monitoring data 3064, and specify the position of each point of the worker, the robot 200, or the workpiece based on the result of comparison.

Also, while the three-dimensional sensor 302 according to the embodiment uses the passive stereo camera including two cameras to acquire the position information of the object in the three-dimensional space, the three-dimensional sensor 302 may also use other means to acquire the position information of the object in the three-dimensional space.

For example, the three-dimensional sensor 300 may also be a so-called active stereo camera including a set of a projector and a camera, and acquire the position information of the object captured by the camera based on the pattern projected from the projector.

In addition, the three-dimensional sensor 300 may also use the so-called time-of-flight (TOF) technology, which irradiates light to the object by a light output means such as a light detection and ranging or laser imaging detection and ranging (LIDAR) and calculates the distance to each point of the object based on the time required until the reflected light returns from the object, to acquire the position information of the object in the three-dimensional space.

In addition, the three-dimensional sensor 300 may also acquire the position information of the object in the three-dimensional space by transmitting radio waves to the object by a radio wave output means such as a radar and calculating the distance to each point of the object based on the time required until the radio waves return from the object.

C. VARIOUS REGIONS

Figure 6:
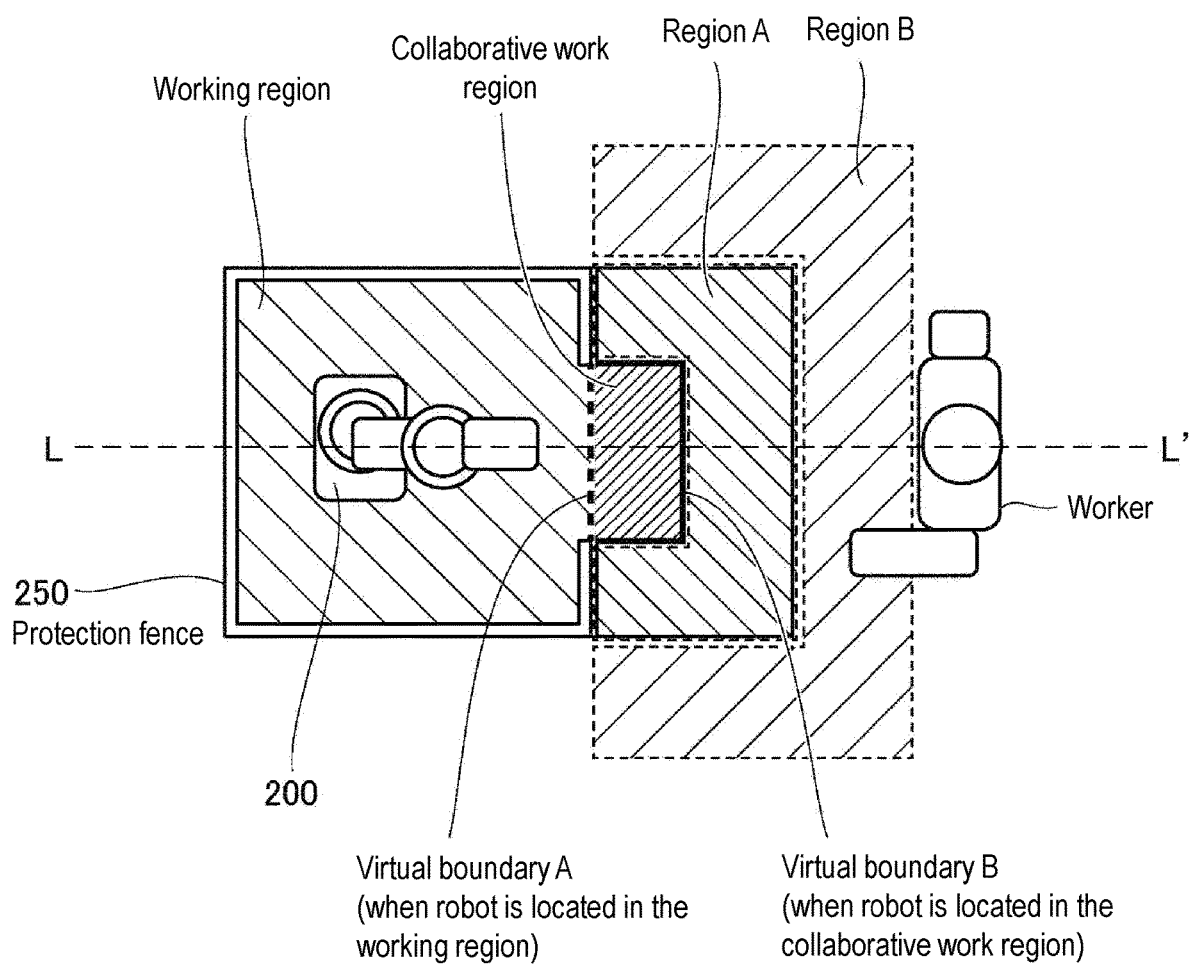
FIG. 6 is a schematic diagram illustrating an example of various regions settable in the control system according to the embodiment.
Figure 7:
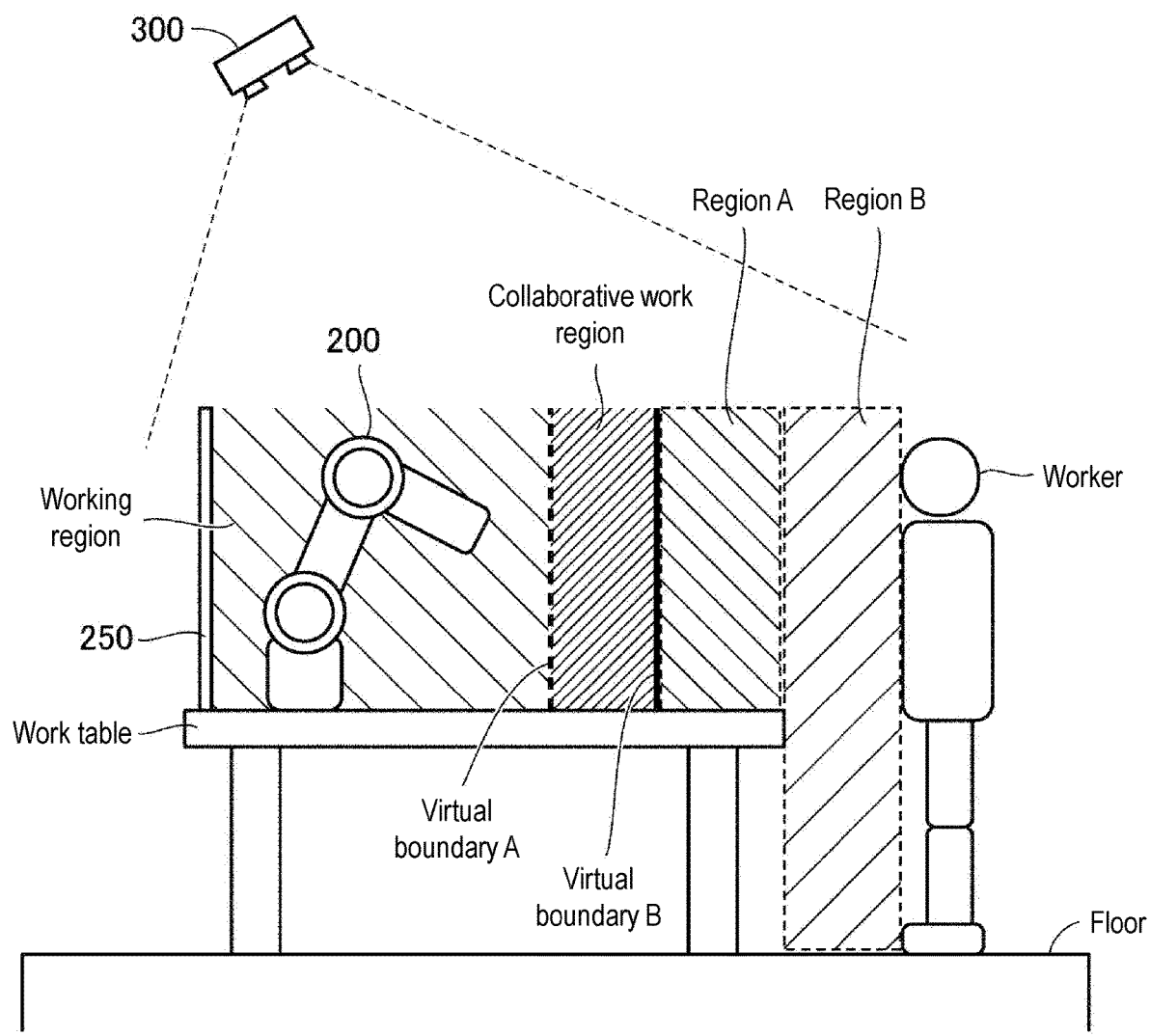
FIG. 7 is a schematic diagram illustrating an example of various regions settable in the control system according to the embodiment.

Then, the various regions set by the support device 400 will be described. FIGS. 6 and 7 are schematic diagrams illustrating an example of various regions settable in the control system 1 according to the embodiment. Specifically, in FIG. 6, various regions in the case where the workplace in the three-dimensional space is viewed from the top are shown. In addition, in FIG. 7, various regions in the case where the workplace in the three-dimensional space is viewed from the side (e.g., an L-L' cross-section shown in FIG. 6) are shown. In the following descriptions, the side where the robot 200 is located when viewed from the collaborative work region is referred to as "robot side", and the side where the worker is located when viewed from the collaborative work region is referred to as "worker side".

As shown in FIGS. 6 and 7, the virtual regions managed by the control system 1 according to the embodiment include a working region, a collaborative work region, a region A, and a region B.

The working region is the region in which the robot 200 works. For safety concerns, a protection fence 250 surrounding the working region is provided. In the case where the robot 200 conforms to the safety standard, the size (e.g., the area) of the working region may be set in advance. It is noted that the size (e.g., the area) of the working region may be determined in advance in accordance with the size of the body part (body) or the maximum length of the arm part (arm) of the robot 200. In the working area, it is arranged in advance that only the robot 200 works. If the worker enters the working region, the control device 100 exerts stopping control to stop the robot 200. In addition, in the case where the robot 200 escapes from the maximum working region set in advance, the control device 100 exerts stopping control to stop the robot 200.

The collaborative work region, as described above, is a region where the worker and the robot 200 are allowed to work. The size (e.g., the area) of the collaborative work region is determined by the user by using the support device 400. The worker and the robot 200 can respectively enter the collaborative work region. That is, in the collaborative work region, the worker can work, and the robot 200 can also work. For example, the worker enters the collaborative work region to place the workpiece in the collaborative work region. Then, when the worker leaves the collaborative work region, at this time, a collaborative work in which the robot 200 enters the collaborative work region and carries the workpiece from the collaborative work region is performed. It is noted that the trigger for the robot 200 to enter the collaborative work region may be a button operation by the worker after the workpiece is placed in the collaborative work region, and may also be that the three-dimensional sensor 300 detects the workpiece is placed in the collaborative work region and the worker leaves the collaborative work region.

The region A is a region located on the worker side from the collaborative work region, and is located to surround the outer side of the collaborative work region. The size (e.g., the area) of the region A is determined by the user by using the support device 400. It is noted that the size of the region A may also be determined automatically depending on required factors such as the size of the collaborative work region, the operational speed of the robot, the time required from the receiving a stopping command to stopping, etc. In the region A, it is determined that only the worker operates. If the robot 200 enters the region A, the control device 100 exerts stopping control to stop the robot 200.

The region B is a region located on the worker side with respect to the region A and is located to surround the outer side of the region A. The size (e.g., the area) of the region B is determined by the user by using the support device 400. It is noted that the size of the region B may also be determined automatically depending on required factors such as the size of the collaborative work region, the operational speed of the robot, the time required from the robot receiving a stopping command to stopping, etc. In the region B, it is determined that only the worker operates. If the robot 200 enters the region B, the control device 100 exerts stopping control to stop the robot 200.

In the respective regions so provided, between the working region and the collaborative work region and between the collaborative work region and the region A, virtual boundary surfaces or boundary lines (also referred to as "virtual boundary" in the following) are provided. Specifically, the virtual boundary between the working region and the collaborative work region is referred to as a virtual boundary A, and the virtual boundary between the collaborative work region and the region A is referred to as a virtual boundary B. In the embodiment, the virtual boundary is a boundary surface (or a boundary line) for ensuring the safety of the worker. In the case where the robot 200 or the worker crosses the virtual boundary, the control device 100 exerts stopping control to stop the robot 200.

The virtual boundary is switched in accordance with whether the position of the robot 200 is included in the collaborative work region. Specifically, in the case where the robot 200 is not located in the collaborative work region but located in the working region, the virtual boundary A between the working region and the collaborative work region is adopted as the virtual boundary, and in the case where the robot 200 is located in the collaborative work region, the virtual boundary B between the collaborative work region and the region A is adopted as the virtual boundary.

D. ROBOT CONTROL TABLE

Then, the robot control table 1064 stored in the storage 106 of the control device 100 is described with reference to FIG. 8. FIG. 8 is a schematic diagram illustrating an example of the robot control table 1064 used in the control system 1 according to the embodiment.

As shown in FIG. 8, the robot control table 1064 stores the command information for controlling the stopping or the speed of the robot 200 in accordance with whether the position of the worker or the robot 200 is included in the collaborative work region and the relative position relationship between the worker and the robot 200.

Specifically, in the case where the worker crosses the virtual boundary to be located in the region on the robot side, or in the case where the robot 200 crosses the virtual boundary to be located in the region on the worker side, since the worker and the robot 200 are located closely in the same region, the control with respect to the robot 200 is set so that the control device 100 exerts stopping control to stop the robot 200.

In the case where the worker is located in the collaborative work region, and the robot 200 is located in the working region, since the worker and the robot 200 are located in different but adjacent regions, the control with respect to the robot 200 is set so that the control device 100 exerts low speed control for the robot 200 to operate at a low speed (e.g., 250 mm/sec). Accordingly, the safety can be ensured, while the productivity is prevented from dropping as much as possible.

In the case where the worker is located in the collaborative work region, and the robot 200 is located in the collaborative work region, since the worker and the robot 200 are located closely in the same region, the control with respect to the robot 200 is set so that the control device 100 exerts stopping control to stop the robot 200.

In the case where the worker is located in the region A, and the robot 200 is located in the working region, since the worker and the robot 200 are located in different but nearby regions, the control with respect to the robot 200 is set so that the control device 100 exerts low speed control for the robot 200 to operate at a low speed (e.g., 250 mm/sec). Accordingly, the safety can be ensured, while the productivity is prevented from dropping as much as possible.

In the case where the worker is located in the region A, and the robot 200 is located in the collaborative work region, since the worker and the robot 200 are located in different but adjacent regions, and the robot 200 works in the collaborative work region, the control with respect to the robot 200 is set so that the control device 100 exerts stopping control to stop the robot 200.

In the case where the worker is located in the region B, and the robot 200 is located in the working region, since the worker and the robot 200 are located in different and apart regions, the control with respect to the robot 200 is set so that the control device 100 exerts medium speed control for the robot 200 to operate at a medium speed (e.g., 750 mm/sec). Accordingly, the productivity does not drop.

In the case where the worker is located in the region B, and the robot 200 is located in the collaborative work region, since the worker and the robot 200 are located in different regions, the control with respect to the robot 200 is set so that the control device 100 exerts low speed control for the robot 200 to operate at a low speed (e.g., 250 mm/sec). Accordingly, the safety can be ensured, while the productivity is prevented from dropping as much as possible.

In the case where the worker is located in another region (e.g., a region on the worker side with respect to the region B), and the robot 200 is located in the working region, since the worker and the robot 200 are located in different and greatly apart regions, the control with respect to the robot 200 is set so that the control device 100 exerts high speed control for the robot 200 to operate at a high speed (e.g., 1500 mm/sec). Accordingly, the productivity can be increased.

In the case where the worker is located in another region (e.g., a region on the worker side with respect to the region B), and the robot 200 is located in the collaborative work region, since the worker and the robot 200 are located in different and apart regions, the control with respect to the robot 200 is set so that the control device 100 exerts medium speed control for the robot 200 to operate at a medium speed (e.g., 750 mm/sec). Accordingly, the productivity does not drop.

Accordingly, in the robot control table 1064, command information for controlling the stopping or the speed of the robot 200, so that the more distant the worker is from the robot, the faster the robot 200 operates and the closer the worker is to the robot 200, the slower the robot 200 operates, is stored.

E. REGION SETTING USER INTERFACE

Figure 9:
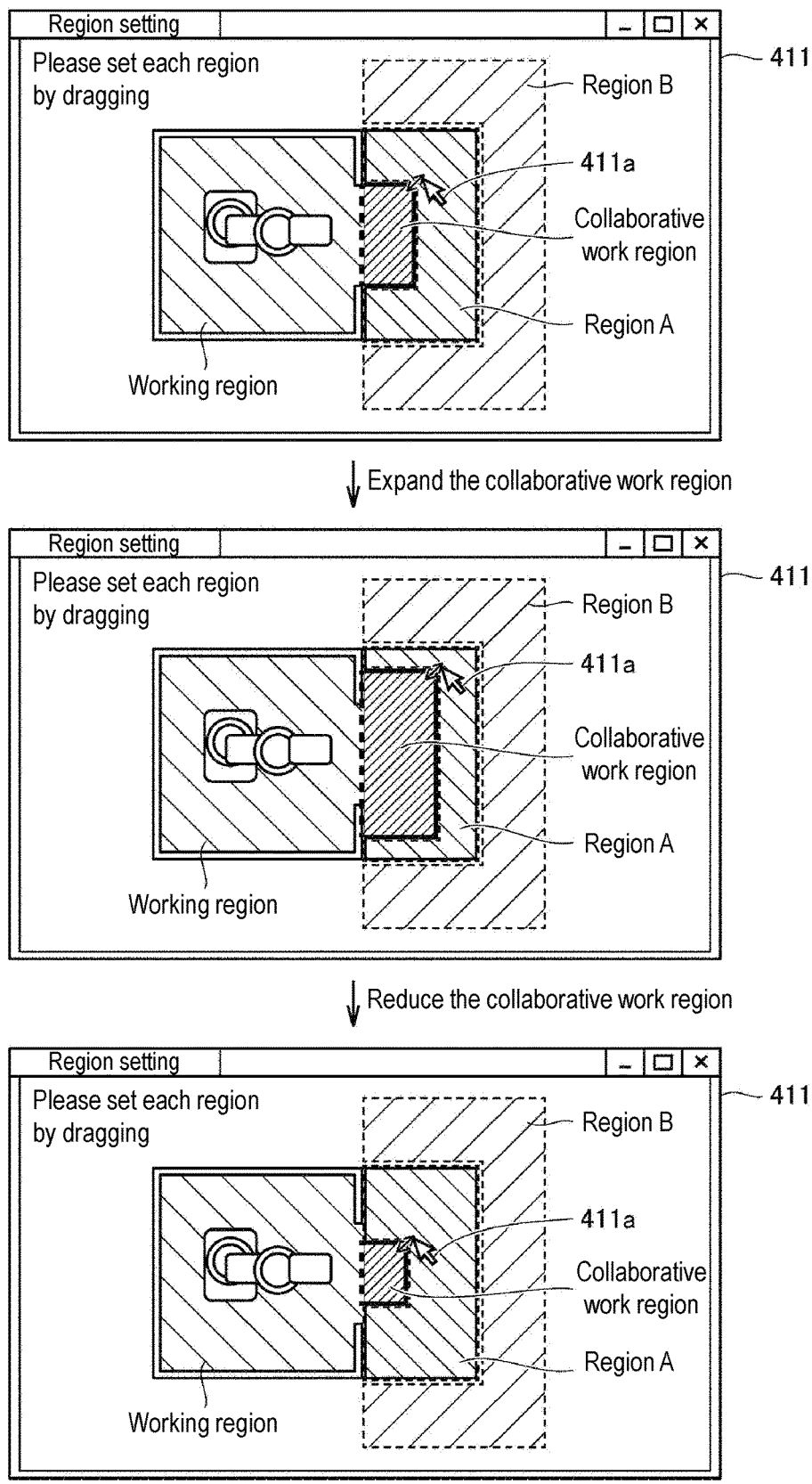
FIG. 9 is a schematic diagram illustrating an example of a region setting in the support device according to the embodiment.

In the following, a user interface 411 for setting the collaborative work region provided by the support device 400 is described with reference to FIG. 9. FIG. 9 is a schematic diagram illustrating an example of a region setting in the support device 400 according to the embodiment.

As shown in FIG. 9, a screen for setting the working region, the collaborative work region, the region A, and the region B is prepared in advance in the region setting user interface 411 provided by the support device 400. The images captured by the cameras 351 and 352 of the three-dimensional sensor 300 may be directly used as the screen shown in FIG. 9. That is, images corresponding to the viewing-field areas of the cameras 351 and 352 may be directly used. Alternatively, the screen shown in FIG. 9 may also be created based on the position information of the object acquired by the three-dimensional sensor 300. For example, in the case where the three-dimensional sensor 300 acquires the position information of the object in the three-dimensional space by using the TOF technology, the screen shown in FIG. 9 may also be created by using a group of points visually embodying the collection of the acquired position information.

The user can move a pointer 411a by using a mouse not shown herein, and enlarge or reduce each region by aligning the pointer 411a with the end of each region.

For example, in the example shown in FIG. 9, if the pointer 411a is aligned with the upper right end of the collaborative work region and the user drags the pointer 411a toward the upper right of the screen, the size (area) of the collaborative work region is increased in accordance with the movement amount of the pointer 411a, and if the user drags the pointer 411a toward the lower left of the screen, the size (area) of the collaborative work region is reduced in accordance with the movement amount of the pointer 411a.

While the example shown in FIG. 9 describes the enlargement and the reduction of the collaborative work region, the user can also enlarge or reduce the size (area) of the region in accordance with the movement amount of the pointer 411a for the working region, the region A, and the region B.

In addition, even though the region A and the region B are prepared in advance in the embodiment, it may also be that the region A or the region B can be canceled, another region different from the region A and the region B (e.g., a region C located outer than the region B on the worker side) can be added through a user operation.

Accordingly, the support device 400 provides the user interface 411 for setting multiple types of regions including the collaborative work region as the regions where the worker and the robot 200 respectively work.

In addition, the support device 400 provides the user interface 411 for virtually setting the collaborative work region based on the image corresponding to the viewing-field area in the three-dimensional sensor 300.

It is noted that the region setting user interface 411 shown in FIG. 9 is merely an example, and the support device 400 may also provide region setting user interfaces in other modes.

F. STOPPING/SPEED SETTING USER INTERFACE

In the following, a user interface 412 for setting the control content of the robot 200 in accordance with the relative position relationship between the worker and the robot 200, which is provided by the support device 400, is described with reference to FIG. 10. FIG. 10 is a schematic diagram illustrating a stopping/speed setting in the support device 400 according to the embodiment.

As shown in FIG. 10, a screen for setting whether to stop the robot 200 or setting the speed at the time of operation in accordance with the current position of the worker and the current position of the robot 200 is prepared in advance in the stopping/speed setting user interface 412 provided by the support device 400. The user can move a pointer 412a on the screen by using a mouse not shown herein, and by aligning the pointer 412a with the frame of the matrix defined by a combination of the current position of the worker and the current position of the robot 200, a drop-down list showing the options of the control content prepared in advance can be displayed.

That is, when the user sets the respective regions including the collaborative work region by using the user interface 411 shown in FIG. 9 in the embodiment, the options are automatically calculated in accordance with the number and sizes (areas) of the respective regions, the specification of the robot 200 (e.g., the length and the operational angle of the respective parts such as the arm, the maximum operational speed, the time required from the receiving a stopping command to stopping), etc. In addition, the calculation of the options is performed from the perspective of risk assessment, and the robot 200 is controlled so that the safety of the worker is ensured regardless of which option is selected by the user.

It is noted that the invention is not limited to automatically calculating the options as the above, but may display all the options prepared by the user in advance, and may display the options prepared by the user in the frame for each matrix defined by the combination of the current position of the worker and the current position of the robot 200.

The user can select the desired control content of the robot 200 by designating one of the options shown in the drop-down list by using the pointer 412a.

For example, in the example shown in FIG. 10, a drop-down list in the case where the worker is located in the collaborative work region and the robot 200 is located in the working region is displayed, and the user selects "low speed" among "stop", "ultra-low speed", and "low speed". Accordingly, as shown in FIG. 8, in the robot control table 1064, in the case where the worker is located in the collaborative work region and the robot 200 is located in the working region, the control with respect to the robot 200 is set so that the control device 100 exerts low speed control for the robot 200 to operate at a low speed.

Accordingly, the support device 400 provides the user interface 412 for setting the control content of the robot 200 in accordance with the relative position relationship between the worker and the robot 200. That is, the support device 400 includes the "control content setting means" according to the disclosure.

It is noted that the stopping/speed setting user interface 412 shown in FIG. 10 is merely an example, and the support device 400 may also provide stopping/speed setting user interfaces in other modes.

G. WORKPIECE NON-DETECTION SETTING USER INTERFACE

Figure 11:
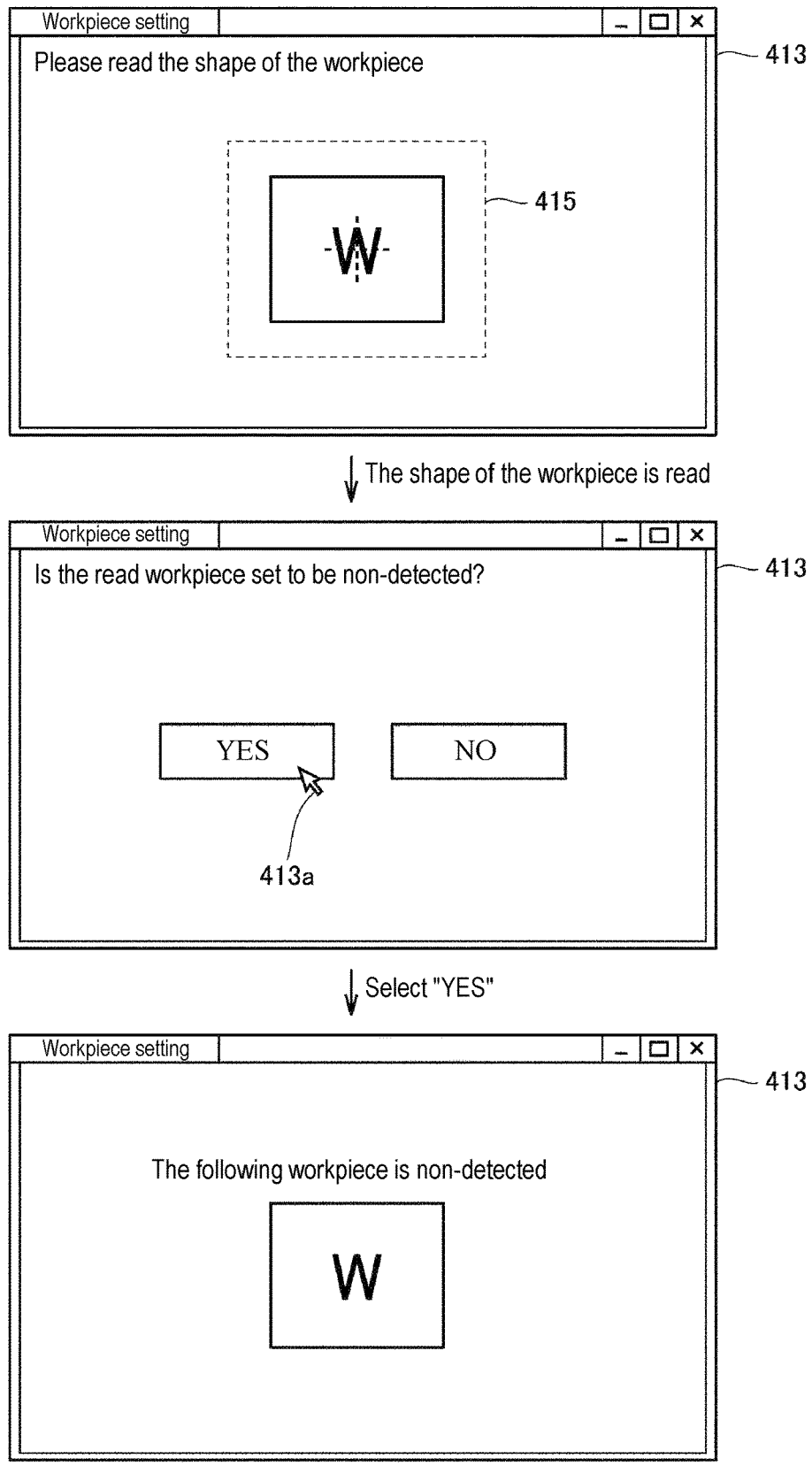
FIG. 11 is a schematic diagram illustrating a workpiece non-detection setting in the support device according to the embodiment.

In the following, a user interface 413 for workpiece non-detection setting provided by the support device 400 is described with reference to FIG. 11. FIG. 11 is a schematic diagram illustrating a workpiece non-detection setting in the support device 400 according to the embodiment.

As shown in FIG. 11, in the user interface 413 for workpiece non-detection setting provided by the support device 400, a screen for disabling the detection of the workpiece by the three-dimensional sensor 300 is prepared. When the workpiece detection by the three-dimensional sensor 300 is disabled, since the position information of the workpiece is not considered for the stopping or speed control of the robot 200 in the control device 100, the stopping or the speed of the robot 200 is not controlled erroneously due to detection of the position of the workpiece. It is noted that, even if the workpiece detection is not disabled, it is also possible to prevent the stopping or the speed of the robot 200 from not being controlled due to detection of the position of the workpiece by teaching the control device 100 the shape of the workpiece in advance.

In the example shown in FIG. 11, first of all, the user makes the three-dimensional sensor 30 read the shape of the workpiece by aligning a frame image 415 to surround the workpiece. Then, the user decides whether to not detect the workpiece that is read by selecting "YES" or "NO". In the case where the user selects "YES", the non-detection of the workpiece is set.

Accordingly, the support device 400 provides the user interface 413 for forbidding the stopping or speed control of the robot 200 by the control device 100 based on the position of the workpiece related to work. Also, the control device 100 forbids the stopping or speed control of the robot 200 resulting from a workpiece set to be non-detected by the support device 400. That is, the control device 100 includes a "forbidding means" according to the disclosure.

It is noted that the workpiece non-detection setting user interface 413 shown in FIG. 11 is merely an example, and the support device 400 may also provide workpiece non-detection setting user interfaces in other modes.

H. EXAMPLE OF SAFETY CONTROL PROCESS

In the following, safety control performed in the control system 1 according to the embodiment is described with reference to FIGS. 12 and 13. FIGS. 12 and 13 are schematic diagrams illustrating an example of a safety control process executed in the control system 1 according to the embodiment. An example of the safety control process shown in FIGS. 12 and 13 is performed by the control device 100 executing the safety program 1062 while referring to the robot control table 1064 shown in FIG. 8.

As shown in FIG. 12, in the case where the worker holding the workpiece is located in another region (e.g., a region on the worker side with respect to the region B) and the robot 200 is located in the working region, the control device 100 exerts high speed control for the robot 200 to operate at a high speed.

Then, in the case where the operator moves to enter the region B, since the worker is located in the region B, and the robot 200 is located in the working region, the control device 100 exerts medium speed control for the robot 200 to operate at a medium speed.

Then, as shown in FIG. 13, in the case where the hand of the worker enters the region A at the time when the worker places the workpiece on the work table, since the worker is located in the region A and the robot 200 is located in the working region, the control device 100 exerts low speed control for the robot 200 to operate at a low speed.

Then, after the worker places the workpiece in the collaborative work region, at the time when the robot 200 enters the collaborative work region to carry the workpiece from the collaborative work region, in the case where the worker erroneously enters the collaborative work region, since the worker is located in the collaborative work region and the robot 200 is located in the collaborative work region, the control device 100 exerts stopping control for the robot 200 to stop.

In this way, according to the control system 1 according to the embodiment, the more apart the worker is from the robot 200, the faster the robot 200 is controlled to operate, and the closer the worker is from the robot 200, the slower the robot 200 is controlled to operate, or even the robot 200 is controlled to stop.

I. FLOW OF SAFETY CONTROL PROCESS

Figure 14:
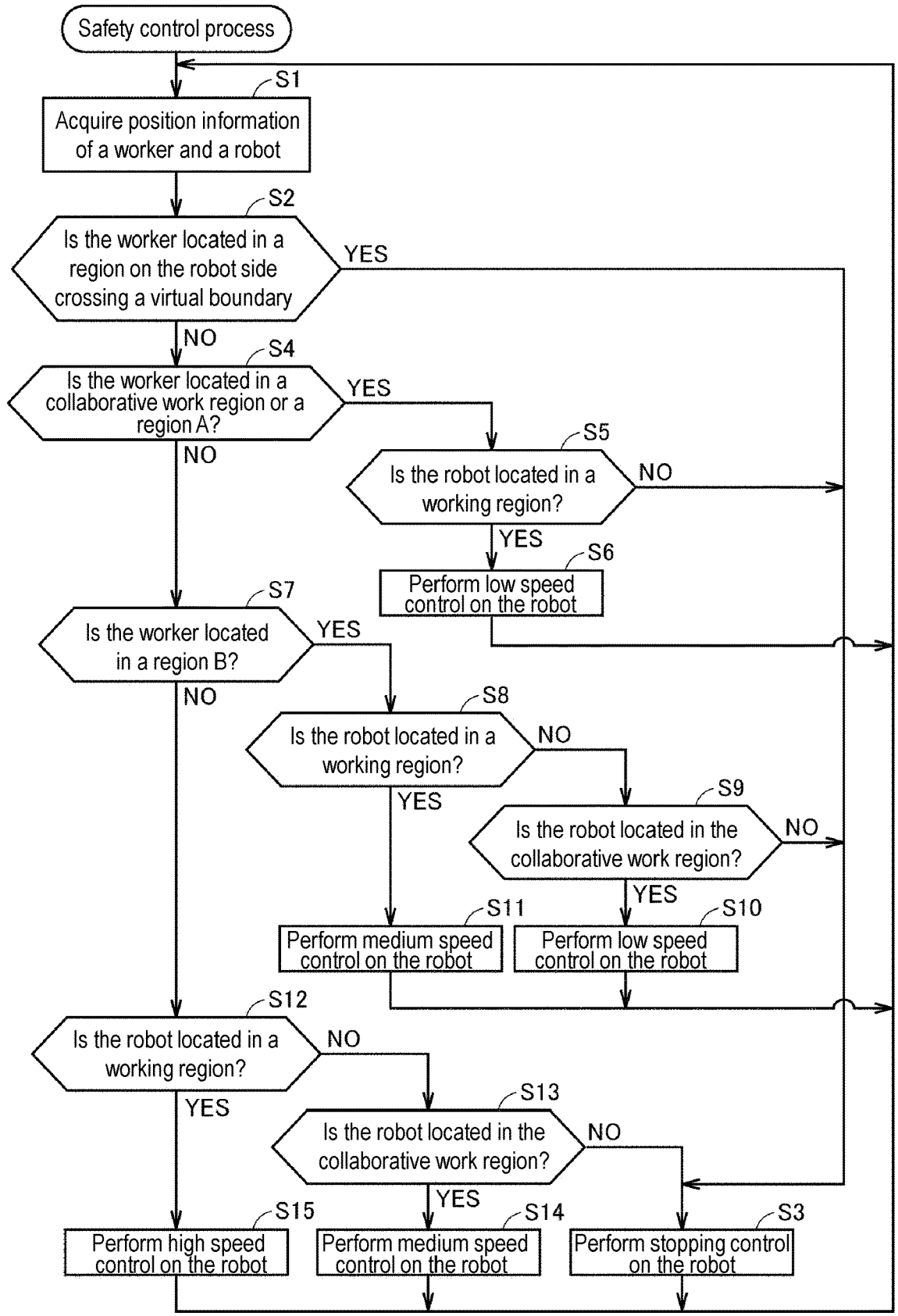
FIG. 14 is a flowchart illustrating a safety control process executed by the control system according to the embodiment.

In the following, the flow of the safety control process executed by the control system 1 according to the embodiment is described with reference to FIG. 14. FIG. 14 is a flowchart illustrating a safety control process executed by the control system 1 according to the embodiment. The safety control process shown in FIG. 14 is performed by the processor 102 of the control device 100 executing the safety program 1062 while referring to the robot control table 1064 shown in FIG. 8.

Firstly, the control device 100 acquires the position information of the worker and the robot 200 from the three-dimensional sensor 300 (S1). Then, the control device 100 determines whether the worker crosses the virtual boundary to be located in a region on the robot side (S2). In the case where the worker crosses the virtual boundary to be located in a region on the robot side (YES in S2), the robot 200 is stopped by the stopping control (S3), and the flow returns to the process of S1.

Meanwhile, in the case where the worker does not cross the virtual boundary to be located in a region on the robot side (NO in S2), the control device 100 determines whether or not the worker is located in the collaborative work region or the region A (S4). In the case where the worker is located in the collaborative work region or the region A (YES in S4), the control device 100 determines whether the robot 200 is located in the working region (S5).

In the case where the robot 200 is not located in the working region (NO in S5), the control device 100 exerts stopping control to stop the robot 200 (S3), and the flow returns to the process of S1. Meanwhile, in the case where the robot 200 is located in the working region (YES in S5), the control device 100 exerts low speed control for the robot 200 to operate at a low speed (S6), and the flow returns to the process of S1.

In S4, in the case where the worker is not located in the collaborative work region or the region A, the control device 100 determines whether the worker is located in the region B (S7). In the case where the worker is located in the region B (YES in S7), the control device 100 determines whether the robot 200 is located in the working region (S8).

In the case where the robot 200 is not located in the working region (NO in S8), the control device 100 determines whether the robot 200 is located in the collaborative work region (S9). In the case where the robot 200 is not located in the collaborative work region (NO in S9), the control device 100 exerts stopping control to stop the robot 200 (S3), and the flow returns to the process of S1. Meanwhile, in the case where the robot 200 is located in the collaborative work region (YES in S9), the control device 100 exerts low speed control for the robot 200 to operate at a low speed (S6), and the flow returns to the process of S1.

In S8, in the case where the robot 200 is located in the working region (YES in S8), the control device 100 exerts medium speed control for the robot 200 to operate at a medium speed (S11), and the flow returns to S1.

In S7, in the case where the worker is not located in the region B (NO in S7), the control device 100 determines whether the robot 200 is located in the working region (S12). In the case where the robot 200 is not located in the working region (NO in S12), the control device 100 determines whether the robot 200 is located in the collaborative work region (S13). In the case where the robot 200 is not located in the collaborative work region (NO in S13), the control device 100 exerts stopping control to stop the robot 200 (S3), and the flow returns to the process of S1. Meanwhile, in the case where the robot 200 is located in the collaborative work region (YES in S13), the control device 100 exerts medium speed control for the robot 200 to operate at a medium speed (S14), and the flow returns to the process of S1.

In S12, in the case where the robot 200 is located in the working region (YES in S12), the control device 100 exerts high speed control for the robot 200 to operate at a high speed (S15), and the flow returns to S1.

In this way, according to the control method (safety control process) of the control system 1 according to the embodiment, the user can virtually set the collaborative work region where the worker and the robot 200 are allowed to work, and can control the stopping or the speed of the robot 200 based on whether the positions of the worker and the robot 200 in the three-dimensional space are included in the virtually set collaborative work region and the relative position relationship between the worker and the robot 200 in the three-dimensional space. Accordingly, the user can increase the safety as well as the productivity in the production site where the robot 200 collaborates with the worker.

J. MODIFIED EXAMPLES

The disclosure is not limited to the above embodiment but is applicable to various modifications and applications. In the following, some modified examples applicable to the disclosure are described. It is noted that, except for the parts different from the control system 1 according to the embodiment described above, the control system shown in the modified examples in the following has the same configuration and functions as the control system 1 according to the embodiment.

Figure 15:
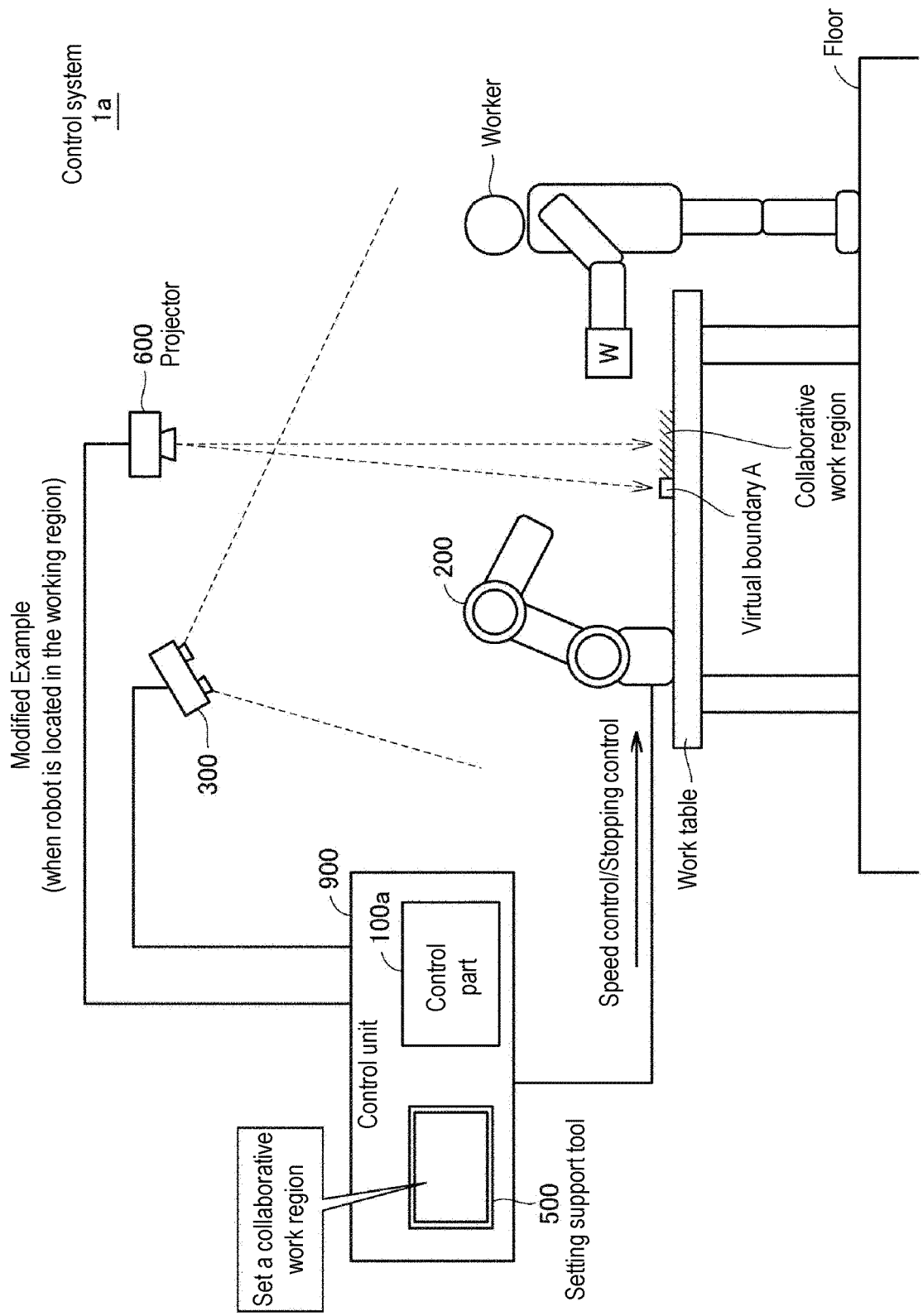
FIG. 15 is a schematic diagram illustrating a control system according to a modified example.
Figure 16:
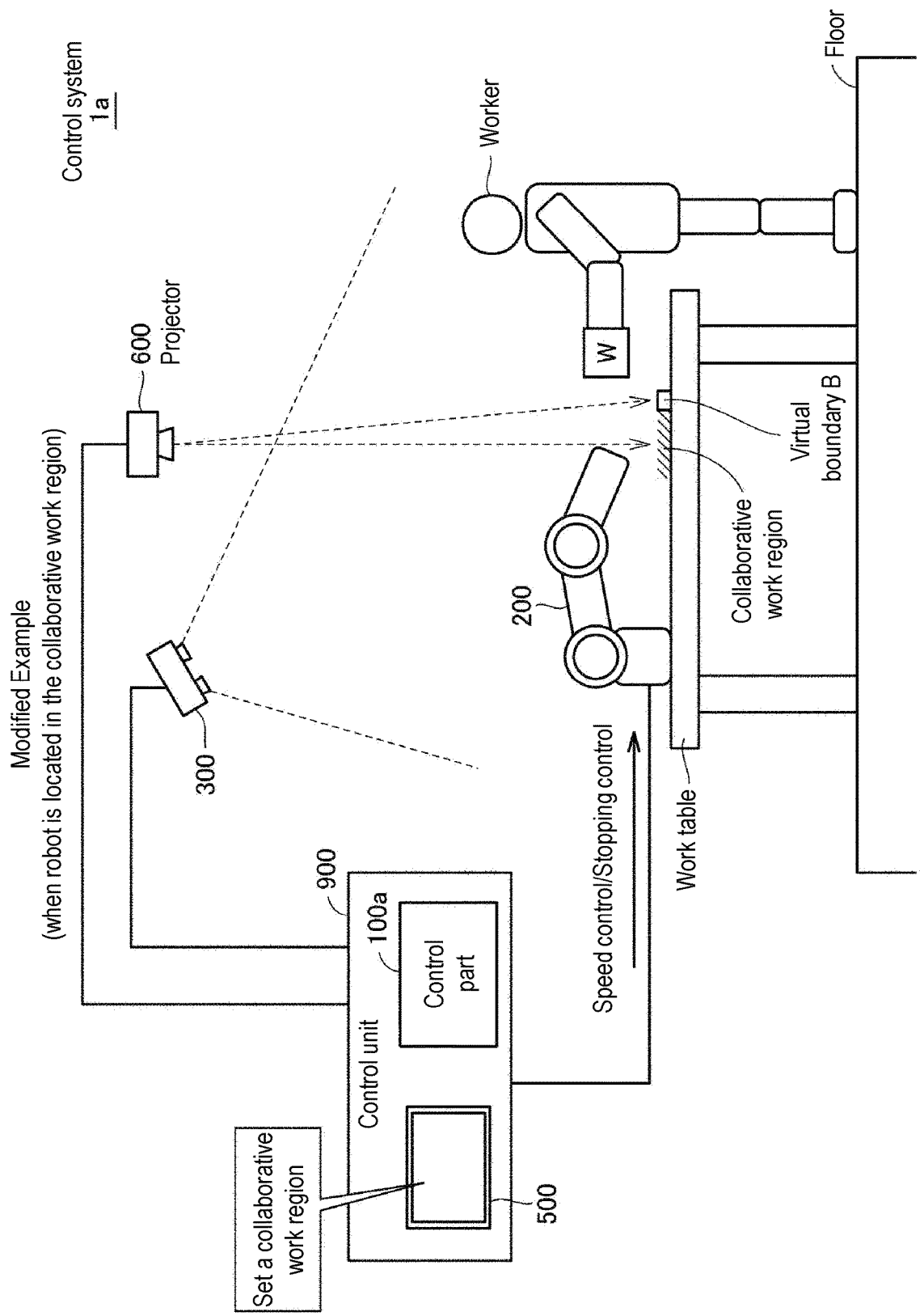
FIG. 16 is a schematic diagram illustrating a control system according to a modified example.

In the following, a control system 1*a* according to the modified example is described with reference to FIGS. 15 and 16. FIGS. 15 and 16 are schematic diagrams illustrating the control system 1*a* according to the modified example.

As shown in FIGS. 15 and 16, the control system 1*a* according to the modified example may also include a projector 600. The projector 600 includes an "embodying means" according to the disclosure, and visually embodies the virtual boundary in the workspace of the worker and the robot 200.

For example, as shown in FIG. 15, in the case where the robot 200 is not located in the collaborative work region but located in the working region, images showing the virtual region A and the collaborative work region are projected to the work table by the projector 600. In addition, as shown in FIG. 16, in the case where the robot 200 is located in the collaborative work region, images showing the virtual region B and the collaborative work region are projected to the work table by the projector 600.

In this way, in the control system 1*a* according to the modified example, since the user can perform a work while checking the virtual boundary visually embodied in the workspace by the projector 600, the safety as well as the productivity can be increased.

In addition, as shown in FIGS. 15 and 16, the control system 1*a* according to the modified example may also include a control unit 900 in which a setting support tool 500 having the function of the support device 400 is integrated with a control part 100*a* having the function of the control device 100. That is, the user may use the user interfaces (the user interfaces as provided in FIGS. 9 to 11) provided by the setting support tool 500 of the control unit 900 to virtually set the collaborative work region, set the control content of the robot 200, or perform the non-detection setting of the workpiece. In addition, the control part 100*a* may also output a control command designating the driving, stopping, and the speed during operation of the robot 200 based on the setting content set by the setting support tool and the position information of the worker and the robot 200 acquired by the three-dimensional sensor 300 to the robot 200.

In this way, according to the control unit 900 according to the modified example, the user can virtually set the collaborative work region where the worker and the robot 200 are allowed to work, and can control the stopping or the speed of the robot 200 based on whether the positions of the worker and the robot 200 in the three-dimensional space are included in the virtually set collaborative work region and the relative position relationship between the worker and the robot 200 in the three-dimensional space. Accordingly, the user can increase the safety as well as the productivity in the production site where the robot 200 collaborates with the worker.

In addition, while the virtual boundary is set in the control system 1 according to the embodiment and the control system 1*a* according to the modified example, the virtual boundary is not necessarily required. Specifically, regarding the object entering the collaborative work region, the control system may also be configured to monitor whether the object enters the collaborative work region from the worker side or the object enters the collaborative work region from the robot side. The control device may determine that the worker enters the collaborative work region in the case where the object enters the collaborative work region from the worker side, and determine that the robot 200 enters the collaborative work region in the case where the object enters the collaborative work region from the robot side. In addition, the control device may control the stopping or the speed of the robot 200 based on whether the object enters the collaborative work region from the worker side or whether the object enters the collaborative work region from the robot side.

In this way, the user can properly control the stopping or the speed of the robot 200 based on whether the object including the worker or the robot 200 enters the collaborative work region or whether the object enters the collaborative work region from the direction of one of the worker side and the robot side. Therefore, the safety as well as the productivity can be increased without setting the virtual boundary.

In addition, although the control device 100 exerts stopping control to stop the robot 200 in the case where the robot 200 and the worker are both located in the collaborative work region in the control system 1 according to the embodiment and the control system 1*a* according to the modified example, the invention is not limited thereto. For example, in the case where the robot 200 is controlled to operate at a speed so low that it does not pose danger to the worker, and the robot 200 is covered by a buffer material so as not to hurt the worker even if the robot 200 contacts the worker, the worker and the robot 200 may also simultaneously work in the collaborative work region. In this case, by using the user interface 412 for setting the control content of the robot 200 as shown in FIG. 10, it may be that the user can select the control content of the robot 200 from the options of "stop", "ultra-low speed", "low speed", etc., for example, in the frame of the matrix where the worker is located in the collaborative work region and the robot 200 is located in the collaborative work region.

K. APPENDIX

As described above, the embodiment includes the following disclosure.

(Configuration 1)

A control system (1), controlling a robot (200), the control system includes: a control means (100), controlling the robot; a three-dimensional sensor means (300), acquiring position information of a worker and the robot comprised in a viewing-field area in a three-dimensional space; and a setting support means (400), providing a user interface (411) for virtually setting a collaborative work region in which the worker and the robot are allowed to work. The control means controls stopping or a speed of the robot based on whether a position of the worker or the robot calculated based on the position information is included in the collaborative work region set by using the user interface and a relative position relationship between the worker and the robot calculated based on the position information.

(Configuration 2)

In the control system of Configuration 1, the control means controls the stopping or the speed of the robot based on whether the worker or the robot crosses a virtual boundary (A, B) virtually provided at an end of the collaborative work region.

(Configuration 3)

In the control system according to Configuration 2, the virtual boundary is switched in accordance with whether the position of the robot is comprised in the collaborative work region.

(Configuration 4)

The control system according to Configuration 2 or 3 includes an embodying means (600) for visually embodying the virtual boundary in a workspace.

(Configuration 5)

In the control system according to Configuration 1, the control means controls the stopping or the speed of the robot based on whether an object including the worker or the robot enters the collaborative work region from a worker side or whether the object enters the collaborative work region from a robot side.

(Configuration 6)

In the control system according to any one of Configurations 1 to 5, the setting support means provides a user interface (411) for setting a plurality of types of regions including the collaborative work region as regions where the worker and the robot respectively work.

(Configuration 7)

The control system according to any one of Configurations 1 to 6 includes a control content setting means (400) providing a user interface (412) for setting a control content of the robot in accordance with the relative position relationship between the worker and the robot.

(Configuration 8)

In the control system according to any one of Configurations 1 to 7, the setting support means provides a user interface (411) for virtually setting the collaborative work region based on an image corresponding to the viewing-field area in the three-dimensional sensor means.

(Configuration 9)

The control system according to any one of Configurations 1 to 8 includes a forbidding means (100) forbidding control of the stopping or the speed of the robot by the control means based on a position of a workpiece related to a work.

(Configuration 10)

A control method for controlling a robot (200), in which a collaborative work region where a worker and the robot are allowed to work is virtually set by a user interface (411), is provided. The control method includes: a step (S2 to S15) of controlling the robot; and a step (S1) of acquiring position information of the worker and the robot comprised in a viewing-field area in a three-dimensional space. The step of controlling the robot includes a step (S2 to S15) of controlling stopping or a speed of the robot based on whether a position of the worker or the robot calculated based on the position information is included in the collaborative work region and a relative position relationship between the worker and the robot calculated based on the position information.

(Configuration 11)

A control unit (900) controlling a robot (200). The control unit includes: a control part (100*a*), controlling the robot; and a setting support tool (500), providing a user interface (411) for virtually setting a collaborative work region in which a worker and the robot are allowed to work. The control part controls stopping or a speed of the robot based on whether a position of the worker or the robot calculated based on position information acquired by a three-dimensional sensor is included in the collaborative work region set by using the user interface and a relative position relationship between the worker and the robot.

L. ADVANTAGES

According to the control system 1 according to the embodiment, the user can virtually set the collaborative work region where the worker and the robot 200 are allowed to work, and can control the stopping or the speed of the robot 200 based on whether the positions of the worker and the robot 200 in the three-dimensional space are included in the virtually set collaborative work region and the relative position relationship between the worker and the robot in the three-dimensional space. Accordingly, the user can increase the safety as well as the productivity in the production site where the robot 200 collaborates with the worker.

It should be considered that the embodiments disclosed herein are exemplary in all respects and not restrictive. The scope of the invention shall be defined by the scope of claims, not the above description, and is intended to include all modifications within the meaning and scope equivalent to the claims.

What is claimed is:

1. A control system, controlling a robot, the control system comprising:
   a control device, controlling the robot;
   a three-dimensional sensor, acquiring position information of a worker and the robot comprised in a viewing-field area in a three-dimensional space; and
   a support device, providing a user interface for virtually setting a collaborative work region in which the worker and the robot are allowed to work,
   wherein the support device provides a user interface for setting a control content of the robot in accordance with a relative position relationship between the worker and the robot,
   wherein the control device controls stopping or a speed of the robot based on whether a position of the worker or the robot calculated based on the position information is comprised in the collaborative work region, the control content and the relative position relationship between the worker and the robot calculated based on the position information.

2. The control system according to claim 1, wherein the control device controls the stopping or the speed of the robot based on whether the worker or the robot crosses a virtual boundary virtually provided at an end of the collaborative work region.

3. The control system according to claim 2, wherein the virtual boundary is switched in accordance with whether the position of the robot is comprised in the collaborative work region.

4. The control system according to claim 3, comprising an projector for visually embodying the virtual boundary in a workspace.

5. The control system according to claim 2, comprising an projector for visually embodying the virtual boundary in a workspace.

6. The control system according to claim 1, wherein the control device controls the stopping or the speed of the robot based on whether an object comprising the worker or the robot enters the collaborative work region from a worker side or whether the object enters the collaborative work region from a robot side.

7. The control system according to claim 1, wherein the support device provides a user interface for setting a plurality of types of regions comprising the collaborative work region as regions where the worker and the robot respectively work.

8. The control system according to claim 1, wherein the support device provides a user interface for virtually setting the collaborative work region based on an image corresponding to the viewing-field area in the three-dimensional sensor.

9. The control system according to claim 1, comprising a control device forbidding control of the stopping or the speed of the robot by the control device based on a position of a workpiece related to a work.

10. A control method for controlling a robot, wherein a collaborative work region where a worker and the robot are allowed to work is virtually set by a user interface, wherein a control content of the robot is set by a user interface in accordance with a relative position relationship between the worker and the robot,
    the control method comprising:
    a step of controlling the robot; and
    a step of acquiring position information of the worker and the robot comprised in a viewing-field area in a three-dimensional space,
    wherein the step of controlling the robot comprises a step of controlling stopping or a speed of the robot based on whether a position of the worker or the robot calculated based on the position information is comprised in the collaborative work region and the relative position relationship between the worker and the robot calculated based on the position information.

11. A control unit, controlling a robot, the control unit comprising:
    a control device, controlling the robot; and
    a setting support tool, providing a user interface for virtually setting a collaborative work region in which a worker and the robot are allowed to work,
    wherein the setting support tool provides a user interface for setting a control content of the robot in accordance with a relative position relationship between the worker and the robot,
    wherein the control device controls stopping or a speed of the robot based on whether a position of the worker or the robot calculated based on position information acquired by a three-dimensional sensor is comprised in the collaborative work region, the control content and the relative position relationship between the worker and the robot.

* * * * *